US 11,529,987 B2

(12) United States Patent
Dowty et al.

(10) Patent No.: US 11,529,987 B2
(45) Date of Patent: Dec. 20, 2022

(54) AIRCRAFT CART RETENTION SYSTEM

(71) Applicant: B/E Aerospace, Inc., Winston-Salem, NC (US)

(72) Inventors: Mark B. Dowty, Rural Hall, NC (US); Daniel M. Rodriguez, Winston Salem, NC (US)

(73) Assignee: B/E Aerospace, Inc., Winston-Salem, NC (US)

( * ) Notice: Subject to any disclaimer, the term of this patent is extended or adjusted under 35 U.S.C. 154(b) by 156 days.

(21) Appl. No.: 17/063,511

(22) Filed: Oct. 5, 2020

(65) Prior Publication Data
US 2022/0105975 A1    Apr. 7, 2022

(51) Int. Cl.
*B62B 5/00*    (2006.01)
*B62B 5/04*    (2006.01)
*A47B 31/06*   (2006.01)
*B62B 3/00*    (2006.01)

(52) U.S. Cl.
CPC .......... *B62B 5/0495* (2013.01); *A47B 31/06* (2013.01); *B62B 3/003* (2013.01); *B62B 2202/67* (2013.01)

(58) Field of Classification Search
CPC ... B62B 5/0495; B62B 3/003; B62B 2202/67; A47B 31/06; B64D 11/04; B64D 11/00; B64D 13/00; B64D 11/06
USPC ...................................................... 280/79.7
See application file for complete search history.

(56) References Cited

U.S. PATENT DOCUMENTS

| 3,179,208 A | * | 4/1965 | Umanoff | ............ B64D 11/0007 186/40 |
| 3,618,884 A | | 11/1971 | Wilson | |
| 3,737,010 A | | 6/1973 | Nelson et al. | |
| 3,751,101 A | | 8/1973 | Miller et al. | |
| 3,918,278 A | * | 11/1975 | Spear | ................... A61G 12/001 70/58 |
| 6,477,962 B2 | * | 11/2002 | Trujillo | .............. B64D 11/0007 104/140 |
| 8,403,343 B1 | | 3/2013 | Seawel | |
| 9,428,097 B2 | | 8/2016 | Konchan et al. | |

(Continued)

FOREIGN PATENT DOCUMENTS

| DE | 3327969 C2 | 9/1985 |
| EP | 2552779 B1 | 9/2016 |

(Continued)

OTHER PUBLICATIONS

Extended Search Report in European Application No. 21200975.7 dated Feb. 18, 2022, 10 pages.

Primary Examiner — John D Walters
Assistant Examiner — Hilary L Johns
(74) Attorney, Agent, or Firm — Suiter Swantz pc llo

(57) ABSTRACT

An aircraft cart retention system may include at least one aircraft cart retention device. The at least one aircraft cart retention device may be configured to retain an aircraft cart in a position proximate to an exterior surface of the structure with at least two combined points of contact during non-taxi, takeoff, or landing (non-TTL) stages of flight when the at least one aircraft cart retention device is in at least one deployed position. The at least one aircraft cart retention device may be configured to allow the aircraft cart to be removed from the position proximate to the exterior surface of the structure when the at least one aircraft cart retention device is in the stowed position.

13 Claims, 22 Drawing Sheets

(56) References Cited

U.S. PATENT DOCUMENTS

| | | |
|---|---|---|
| 9,695,619 B2 | 7/2017 | Burd |
| 9,738,387 B2 | 8/2017 | Holtorf et al. |
| 10,017,086 B2 | 7/2018 | Paunov |
| 10,377,493 B2 | 8/2019 | Burd |
| 10,472,068 B2 | 11/2019 | Coombs |
| 2002/0130219 A1* | 9/2002 | Parseghian ............... B64C 1/18 244/118.6 |
| 2008/0159843 A1* | 7/2008 | Yuyama ............... B65G 59/063 414/788.2 |
| 2018/0016013 A1 | 1/2018 | Burd et al. |
| 2018/0273157 A1 | 9/2018 | Hoogeveen et al. |
| 2020/0181942 A1 | 6/2020 | Bauer et al. |

FOREIGN PATENT DOCUMENTS

| | | | |
|---|---|---|---|
| EP | 3333076 B1 | 6/2019 | |
| FR | 3070709 B1 | 9/2019 | |
| WO | WO-2010108775 A2 * | 9/2010 | ............. B61D 35/00 |
| WO | 2017191202 A1 | 11/2017 | |

* cited by examiner

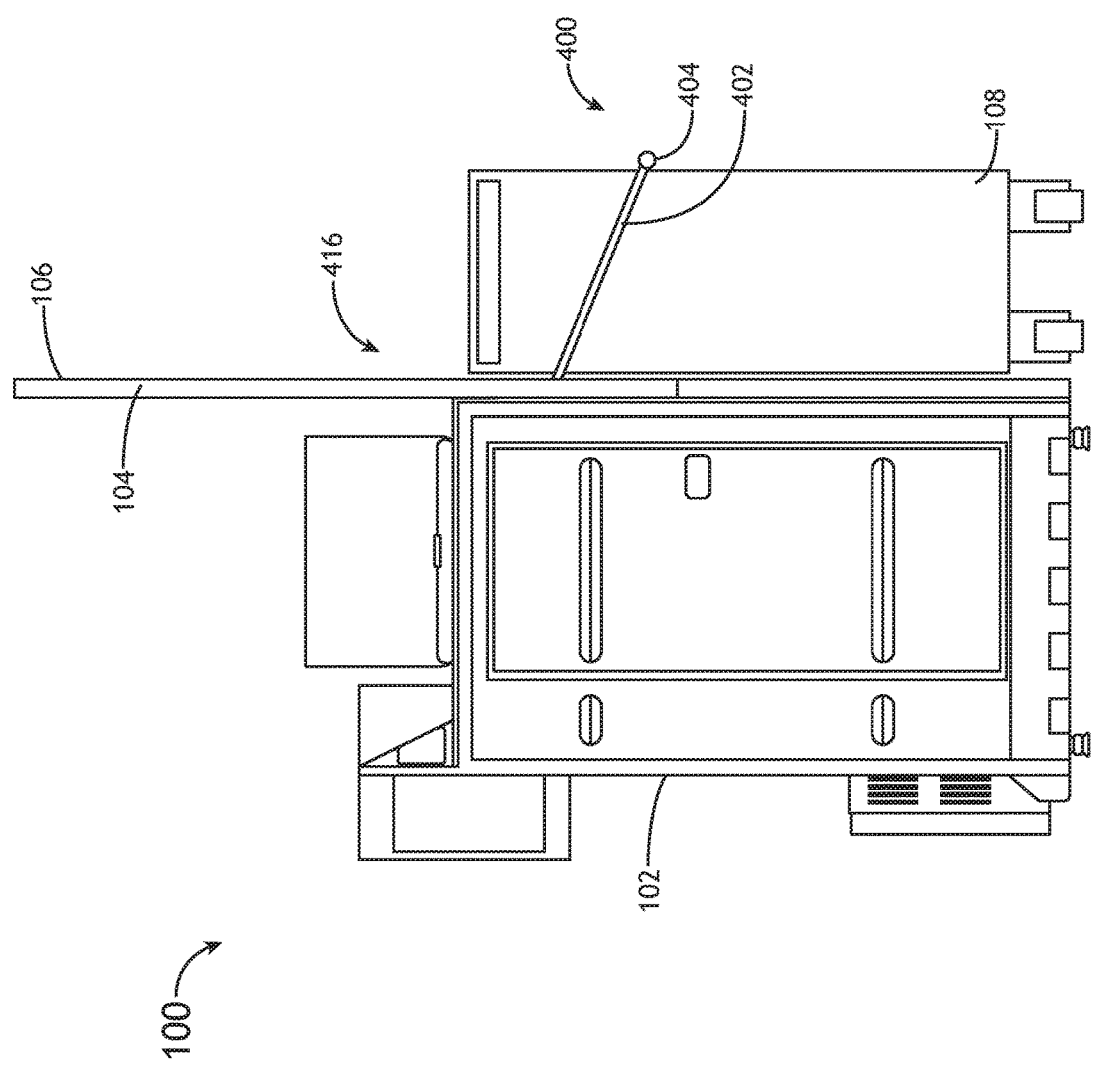

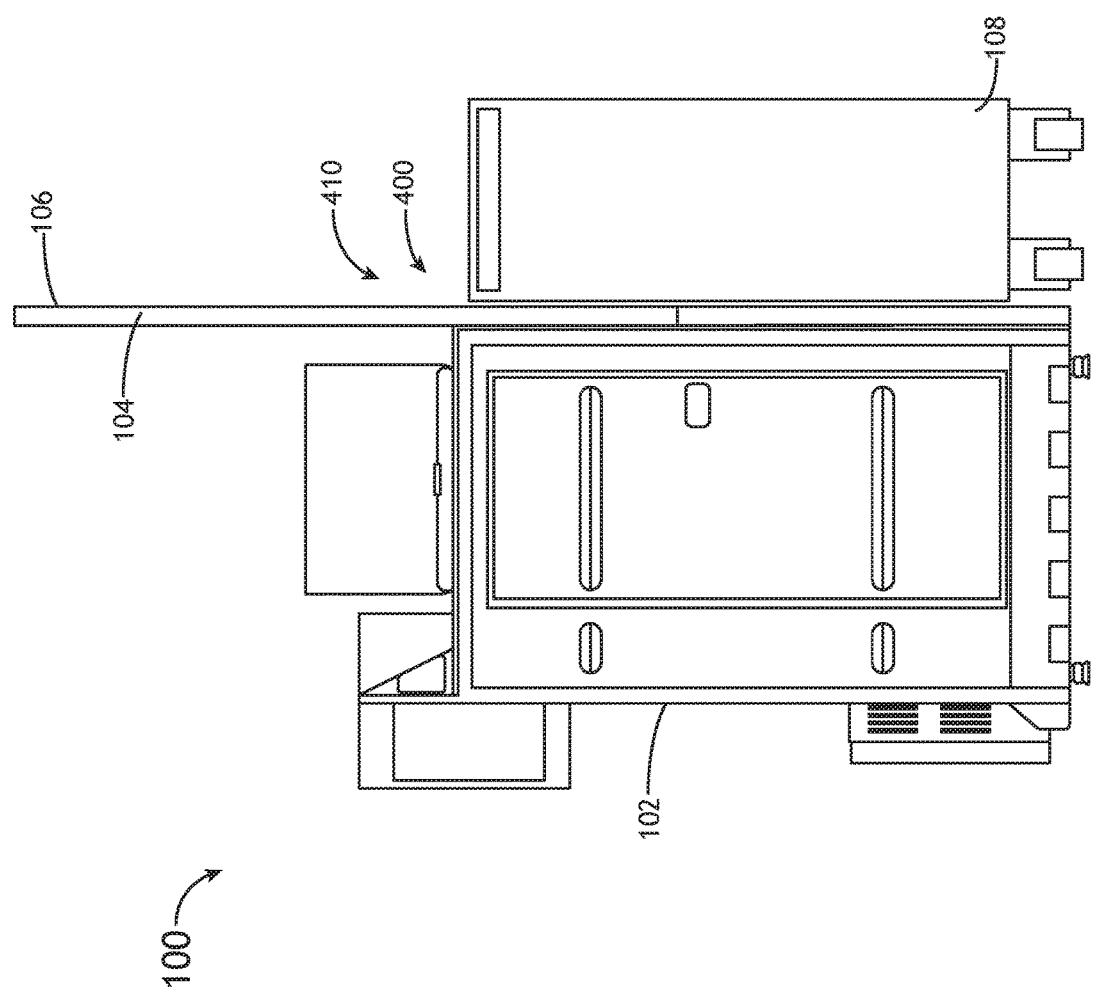

US 11,529,987 B2

AIRCRAFT CART RETENTION SYSTEM

BACKGROUND

Aircraft service providers may provide in-flight self-service snack and/or drink offerings within an aircraft cabin. For example, the offerings may be stored within dedicated, accessible compartments of a monument in the aircraft cabin. By way of another example, the offerings may be temporarily displayed on a galley countertop during non-taxi, takeoff, or landing (TTL) stages (e.g., positioned within a custom entryway or exit of the aircraft cabin). By way of another example, the offerings may be temporarily displayed on a galley cart or trolley during the non-TTL stages (e.g., positioned within the custom entryway or exit of the aircraft cabin). Here, the galley cart may also act as a trash receptable when in the entryway or exit.

Where the offerings are displayed on the galley cart during the non-TTL stages, the galley cart may be stowed flush against a wall of the monument or within the entryway or exit of the aircraft cabin. For example, the galley cart may be unrestrained. By way of another example, the galley cart may be restrained with a setup such as a strap. The galley cart, however, may need to be separately restrained within a galley cart bay within a monument in the aircraft cabin during TTL stages of flight.

SUMMARY

An aircraft cart retention system is disclosed, in accordance with one or more embodiments of the disclosure. The retention system may include a first aircraft cart retention device configured to actuate between a first deployed position and a first stowed position. The first aircraft cart retention device may include at least one member coupled to a structure installed within an aircraft cabin. The first aircraft cart retention device may include at least one latch coupled to the at least one member. The retention system may include a second aircraft cart retention device configured to actuate between a second deployed position and a second stowed position. The second aircraft cart retention device may include at least an additional member coupled to the structure installed within the aircraft cabin. The second aircraft cart retention device may include at least an additional latch coupled to the at least an additional member. The first aircraft cart retention device and the second aircraft cart retention device may be configured to retain an aircraft cart in a position proximate to an exterior surface of the structure with at least two combined points of contact during non-taxi, takeoff, or landing (non-TTL) stages of flight when the first aircraft cart retention device is in the first deployed position and the second aircraft cart retention device is in the second deployed position. The first aircraft cart retention device and the second aircraft cart retention device may be configured to allow the aircraft cart to be removed from the position proximate to the exterior surface of the structure when the first aircraft cart retention device is in the first stowed position and the second aircraft cart retention device is in the second stowed position.

In some embodiments, the at least one member may include a first linkage, a second linkage, and a first connecting linkage coupled to the first linkage and the second linkage. The at least an additional member may include a third linkage, a fourth linkage, and a second connecting linkage coupled to the third linkage and the fourth linkage.

In some embodiments, the at least one latch may include a first latch coupled proximate to a first joint coupling the first linkage and the first connecting linkage, and a second latch coupled proximate to a second joint coupling the second linkage and the first connecting linkage. The at least an additional latch may include a third latch coupled proximate to a third joint coupling the third linkage and the second connecting linkage, and a fourth latch coupled proximate to a fourth joint coupling the fourth linkage and the second connecting linkage.

In some embodiments, the at least one member may be configured to rotate about at least one axis through at least one hinge coupling the at least one member to the structure. The at least an additional member may be configured to rotate about an at least an additional axis through at least an additional hinge coupling the at least an additional member to the structure.

In some embodiments, the at least one axis and the at least an additional axis may be collinear.

In some embodiments, the structure may include a first cavity configured to receive the first aircraft cart retention device when the first aircraft cart retention device is in the first stowed position. The first aircraft cart retention device may be configured to be at least partially inset within the first cavity when the first aircraft cart retention device is in the first stowed position. The structure may include a second cavity configured to receive the second aircraft cart retention device when the second aircraft cart retention device is in the second stowed position. The second aircraft cart retention device may be configured to be at least partially inset within the second cavity when the second aircraft cart retention device is in the second stowed position.

In some embodiments, the at least one member may include at least one shaft. The at least an additional member may include at least an additional shaft.

In some embodiments, the at least one shaft may be configured to extend outward from the structure when the first aircraft retention device is in the deployed position. The at least one shaft may be configured to be inserted in the structure when the first aircraft retention device is in the deployed position. The at least an additional shaft may be configured to extend outward from the structure when the second aircraft retention device is in the deployed position. The at least an additional shaft may be configured to be inserted in the structure when the second aircraft retention device is in the deployed position.

In some embodiments, a third aircraft cart retention device may be configured to actuate between a third deployed position and a third stowed position. The third aircraft cart retention device may include at least a third member coupled to the structure installed within the aircraft cabin. The third aircraft cart retention device may include at least a third latch coupled to the at least a third member. The first aircraft cart retention device and the third aircraft cart retention device may be configured to retain a second aircraft cart in a second position proximate to the exterior surface of the structure with at least two points of contact during the non-TTL stages of flight when the first aircraft cart retention device is in the first deployed position and the third aircraft cart retention device is in the third deployed position. The first aircraft cart retention device and the third aircraft cart retention device may be configured to allow the aircraft cart to be removed from the second position proximate to the exterior surface of the structure when the first aircraft cart retention device is in the first stowed position and the third aircraft cart retention device is in the third stowed position. The second aircraft cart may be smaller than the first aircraft cart.

An aircraft cart retention system is disclosed, in accordance with one or more embodiments of the disclosure. The retention system may include an aircraft cart retention device configured to actuate between a deployed position and a stowed position. The aircraft cart retention device may include a first primary member coupled to a structure installed within an aircraft cabin. The aircraft cart retention device may include a second primary member coupled to the structure installed within the aircraft cabin. The aircraft cart retention device may include at least one auxiliary member coupled to the first primary member and the second primary member. The aircraft cart retention device may be configured to retain an aircraft cart in a position proximate to an exterior surface of the structure during non-taxi, takeoff, or landing (non-TTL) stages of flight when the aircraft cart retention device is in the deployed position. The aircraft cart retention device may be configured to allow the aircraft cart to be removed from the position proximate to the exterior surface of the structure when the aircraft cart retention device is in the stowed position.

In some embodiments, the structure may include a cavity configured to receive the aircraft cart retention device when the aircraft cart retention device is in the stowed position. The aircraft cart retention device may be configured to be at least partially inset within the cavity when the aircraft cart retention device is in the stowed position.

In some embodiments, the aircraft cart retention system further includes at least one separator member coupled to the structure installed within the aircraft cabin. The at least one separator member may be configured to actuate between a second deployed position and a second stowed position. The aircraft cart retention device and the at least one separator member may be configured to retain a second aircraft cart in a second position proximate to the exterior surface of the structure during the non-TTL stages of flight when the aircraft cart retention device is in the first deployed position and the at least one separator member is in the second deployed position. The aircraft cart retention device and the at least one separator member may be configured to allow the aircraft cart to be removed from the second position proximate to the exterior surface of the structure when the aircraft cart retention device is in the first deployed position and the at least one separator member is in the second deployed position. The second aircraft cart may be smaller than the first aircraft cart.

In some embodiments, the at least one separator member may be configured to independently actuate relative to the aircraft cart retention device.

In some embodiments, the at least one separator member may be configured to couple to the at least one auxiliary member of the aircraft cart retention device.

In some embodiments, the structure may include a second cavity configured to receive the at least one separator member when the at least one separator member is in a second stowed position. The aircraft cart retention device may be configured to be at least partially inset within the second cavity when a second aircraft cart retention device is in the second stowed position. The second cavity may be connected with the cavity.

This Summary is provided solely as an introduction to subject matter that is fully described in the Detailed Description and Drawings. The Summary should not be considered to describe essential features nor be used to determine the scope of the Claims. Moreover, it is to be understood that both the foregoing Summary and the following Detailed Description are examples and explanatory only and are not necessarily restrictive of the subject matter claimed.

BRIEF DESCRIPTION OF THE DRAWINGS

The detailed description is described with reference to the accompanying figures. The use of the same reference numbers in different instances in the description and the figures may indicate similar or identical items. Various embodiments or examples ("examples") of the present disclosure are disclosed in the following detailed description and the accompanying drawings. The drawings are not necessarily to scale. In general, operations of disclosed processes may be performed in an arbitrary order, unless otherwise provided in the claims. In the drawings:

FIG. 6A illustrates a lateral view of an aircraft monument with an aircraft cart retention device and an aircraft cart, in accordance with one or more embodiments of the disclosure;

FIG. 6C illustrates a lateral view of an aircraft monument with an aircraft cart retention device and an aircraft cart, in accordance with one or more embodiments of the disclosure;

DETAILED DESCRIPTION OF THE INVENTION

Figure 1A:
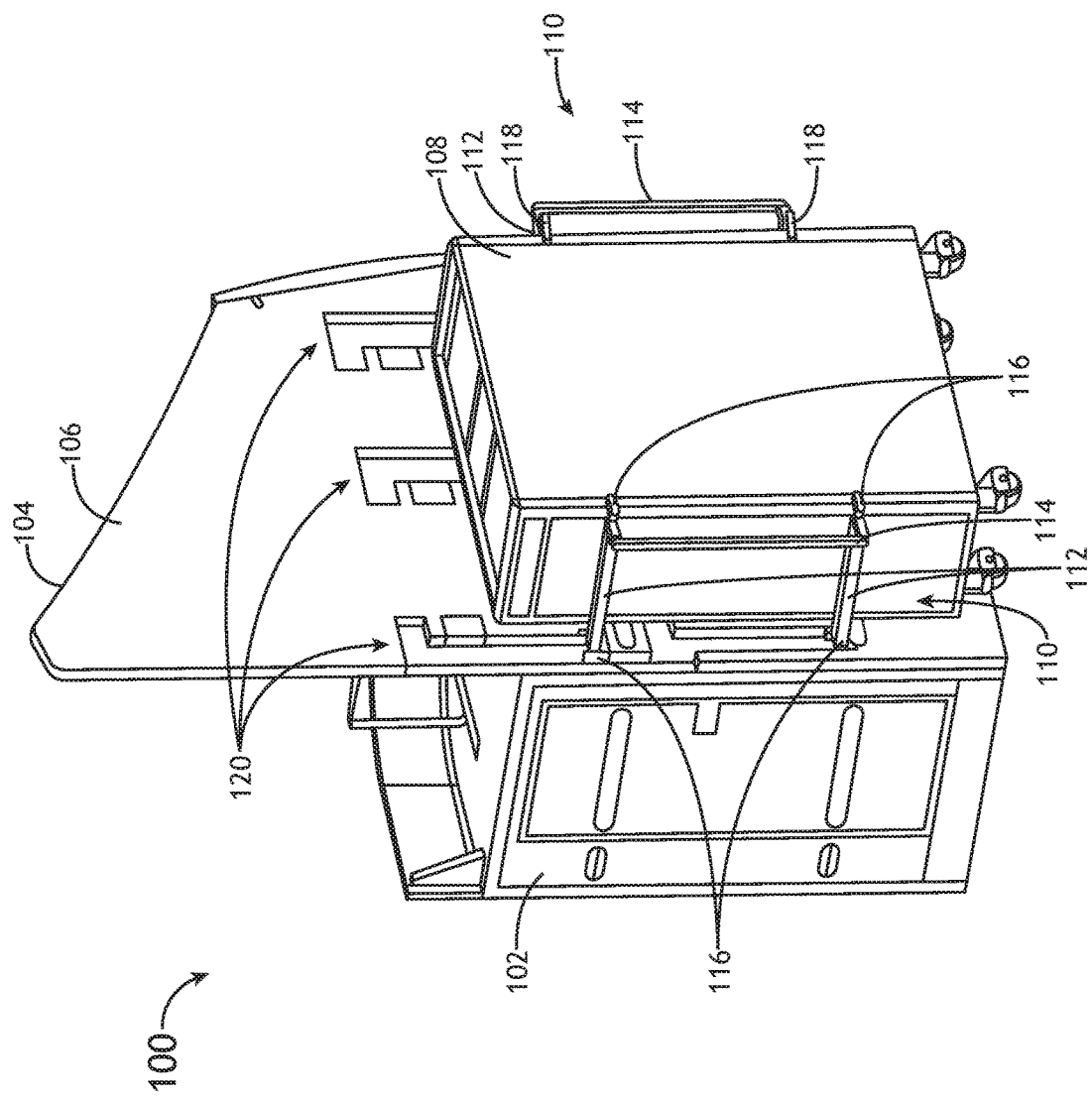
FIG. 1A illustrates a perspective view of an aircraft monument with an aircraft cart retention device and an aircraft cart, in accordance with one or more embodiments of the disclosure.

Reference will now be made in detail to the subject matter disclosed, which is illustrated in the accompanying drawings.

Before explaining one or more embodiments of the disclosure in detail, it is to be understood the embodiments are not limited in their application to the details of construction and the arrangement of the components or steps or methodologies set forth in the following description or illustrated in the drawings. In the following detailed description of embodiments, numerous specific details may be set forth in order to provide a more thorough understanding of the disclosure. However, it will be apparent to one of ordinary skill in the art having the benefit of the instant disclosure the embodiments disclosed herein may be practiced without some of these specific details. In other instances, well-known features may not be described in detail to avoid unnecessarily complicating the instant disclosure.

As used herein a letter following a reference numeral is intended to reference an embodiment of the feature or element that may be similar, but not necessarily identical, to a previously described element or feature bearing the same reference numeral (e.g., 1, 1a, 1b). Such shorthand notations are used for purposes of convenience only and should not be construed to limit the disclosure in any way unless expressly stated to the contrary.

Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of "a" or "an" may be employed to describe elements and components of embodiments disclosed herein. This is done merely for convenience and "a" and "an" are intended to include "one," "one or more," or "at least one," and the singular also includes the plural unless it is obvious that it is meant otherwise.

Finally, as used herein any reference to "one embodiment" or "some embodiments" means that a particular element, feature, structure, or characteristic described in connection with the embodiment is included in at least one embodiment disclosed herein. The appearances of the phrase "in some embodiments" in various places in the specification are not necessarily all referring to the same embodiment, and embodiments may include one or more of the features expressly described or inherently present herein, or any combination of or sub-combination of two or more such features, along with any other features which may not necessarily be expressly described or inherently present in the instant disclosure.

FIGS. 1A-8B in general illustrate an aircraft cart retention device, in accordance with one or more embodiments of the disclosure.

Aircraft service providers may provide in-flight self-service snack and/or drink offerings within an aircraft cabin. For example, the offerings may be stored within dedicated, accessible compartments of a monument in the aircraft cabin. By way of another example, the offerings may be temporarily displayed on a galley countertop during non-taxi, takeoff, or landing (non-TTL) stages (e.g., positioned within a custom entryway or exit of the aircraft cabin). By way of another example, the offerings may be temporarily displayed on a galley cart or trolley during the non-TTL stages (e.g., positioned within the custom entryway or exit of the aircraft cabin). Here, the galley cart may also act as a trash receptable when in the entryway or exit.

Where the offerings are displayed on the galley cart during the non-TTL stages, the galley cart may be stowed flush against a wall of the monument or within the entryway or exit of the aircraft cabin. For example, the galley cart may be unrestrained. By way of another example, the galley cart may be restrained with a setup such as a strap or chain. The galley cart, however, may need to be separately restrained within a galley cart bay of a monument in the aircraft cabin during TTL stages of flight.

Although a permanent structure may not be possible for purposes of retaining or securing the galley cart within the entryway or exit of the aircraft cabin, it would be desirable to provide a lightweight mechanism such as a retention device to replace a strap or chain. The retention device may be a more secure approach to retaining the galley cart. In addition, the retention device may offer an aesthetically appealing alternative to the strap or chain. Further, the retention device may provide a simple and intuitive retention and release function.

Referring in general to FIGS. 1A-8B, an aircraft cabin 100 may include one or more aircraft monuments 102, in accordance with one or more embodiments of the disclosure. It is noted herein the one or more aircraft monuments 102 may face in any direction (e.g., forward-facing, rear-facing, or the like) within the aircraft cabin 100.

The monument 102 may include or may be coupled to a structure 104 (wall, divider, partition, or the like). It is noted herein the monument 102 and/or the structure 104 may be installed anywhere within the aircraft cabin 100. In one non-limiting example, the monument 102 and/or the structure 104 may be installed within a galley section of the aircraft cabin 100. In another non-limiting example, the monument 102 and/or the structure 104 may be installed proximate to an aisle of the aircraft cabin 100. The wall or structure 104 may include an exterior surface 106.

The aircraft cabin 100 may include one or more galley carts 108.

An aircraft monument 102 may include one or more aircraft cart bays for the one or more galley carts 108. For example, the one or more aircraft cart bays may include a double cart bay, a single cart bay door, or the like. It is noted herein "aircraft cart bay" and variants of the term including, but not limited to, "cart bay," or the like may be considered equivalent, for purposes of the disclosure.

A cart bay may include one or more aircraft cart bay doors. For example, the one or more cart bay doors may be a double cart bay door, a single cart bay door, a bi-fold cart bay door, or the like. It is noted herein "aircraft cart bay door" and variants of the term including, but not limited to, "cart bay door," or the like may be considered equivalent, for purposes of the disclosure.

The cart bay may be configured to house one or more aircraft carts 108. For example, the one or more aircraft carts 108 may include full-size aircraft carts or reduced-size aircraft carts (e.g., half-size aircraft carts, or the like). For instance, the full-size aircraft carts may be wide aircraft carts, while the reduced-size aircraft carts may be narrow aircraft carts. By way of another example, the one or more aircraft carts 108 may include tall aircraft carts or short aircraft carts. It is noted herein "aircraft cart," "cart," "trolley," "trolley cart," or the like may be considered equivalent, for purposes of the disclosure.

An aircraft cart 108 may include a body. The body of the aircraft cart 108 may be configured to fit within the cart bay. For example, the body of each of multiple carts 108 may be configured to fit within a single cart bay. For instance, the multiple carts 108 may be configured to fit side-by-side. In addition, the multiple carts 108 may be configured to fit end-to-end.

The aircraft cart 108 may include a cart content door. The cart content door may be coupled to the body of the aircraft cart 108. The cart bay door and the cart content door may be hinged on a same side, such that the cart bay door may rotate about an axis in the same direction as the cart content door (e.g., both counter-clockwise (CCW) or both clockwise (CW)). The cart bay door and the cart content door may be hinged on different sides, such that the cart bay door may rotate in a different direction as the cart content door (e.g., CCW for the cart bay door versus CW for the cart content door, or vice versa). It is noted herein "aircraft cart content door," and "cart content door," or the like may be considered equivalent, for purposes of the disclosure.

It is noted herein that an aircraft monument 102 may include one or more storage compartments in addition to or in the alternative to the one or more aircraft cart bays.

The one or more storage compartments may be configured to store one or more galley service items (e.g., food options, drink options, or the like). The one or more storage compartments may be configured to store one or more aircraft cabin amenities (e.g., pillows, blankets, bassinets, or the like). The one or more storage compartments may include one or more safety devices (e.g., air masks, personal floatation devices, or the like).

The one or more storage compartments may include a storage compartment (e.g., a wardrobe) configured to receive long and/or large items (e.g., passenger amenities needing to be hung, carry-on luggage, or the like) that require an increased space and/or that a passenger may prefer to store in a substantially vertical or upright orientation. The one or more storage compartments may be configured to receive and hold (e.g., contain, secure, or the like) one or more passenger amenities including, but not limited to, paper-printed materials (e.g., magazines, newspapers, pamphlets, or the like), select personal electronic devices (e.g., phones, tablets, phablets, laptops, music devices, digital video disc (DVD) players, handheld gaming consoles or devices, or the like), food products, drink products, or the like. The one or more storage compartments may include one or more electronic connections for one or more passenger amenities such as, but not limited to, one or more charging ports, one or more charging cables, or the like. The one or more storage compartments may include one or more electronic connections in communication with one or more components of the passenger compartment such as, but not limited to, one or more display device connection ports, one or more display device connection cables, one or more audio output jacks (e.g., headphone jacks), one or more audio input jacks, or the like.

The one or more storage compartments may include a door. The one or more storage compartments may be similar to a shelving unit without doors.

The one or more aircraft carts 108 may be configured to stow flush in a select position proximate to (e.g., a select distance from or against) the exterior surface 106 of the structure 104 during non-TTL stages of flight. To retain the one or more aircraft carts 108 against the exterior surface 106, one or more aircraft cart retention devices may be used. For example, an aircraft cart retention system may need a number of the aircraft cart retention devices so as to universally accept and retain any size and/or any height of aircraft cart 108. It is noted herein "aircraft cart retention device," "retention device," or the like may be considered equivalent, for purposes of the disclosure.

Figure 1B:
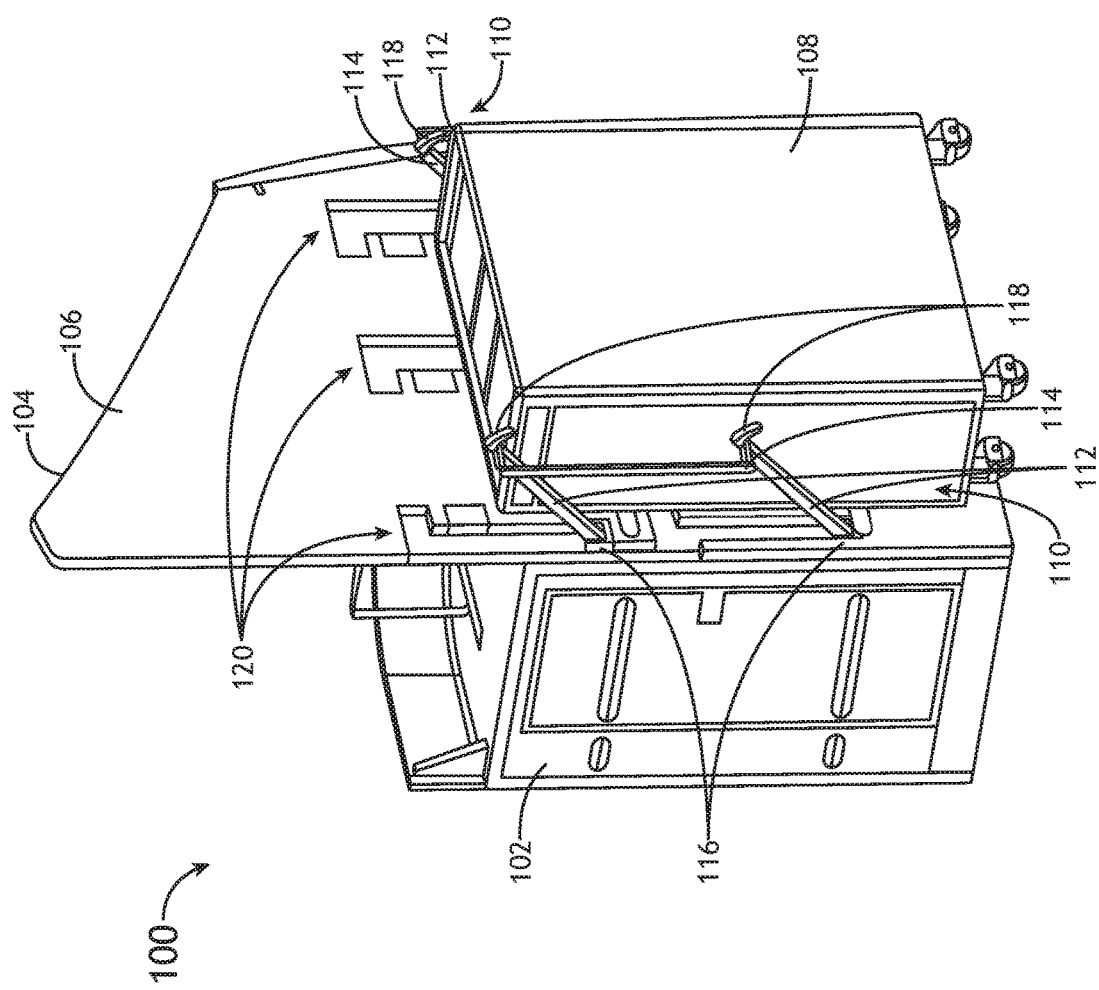
FIG. 1B illustrates a perspective view of an aircraft monument with an aircraft cart retention device and an aircraft cart, in accordance with one or more embodiments of the disclosure.
Figure 1C:
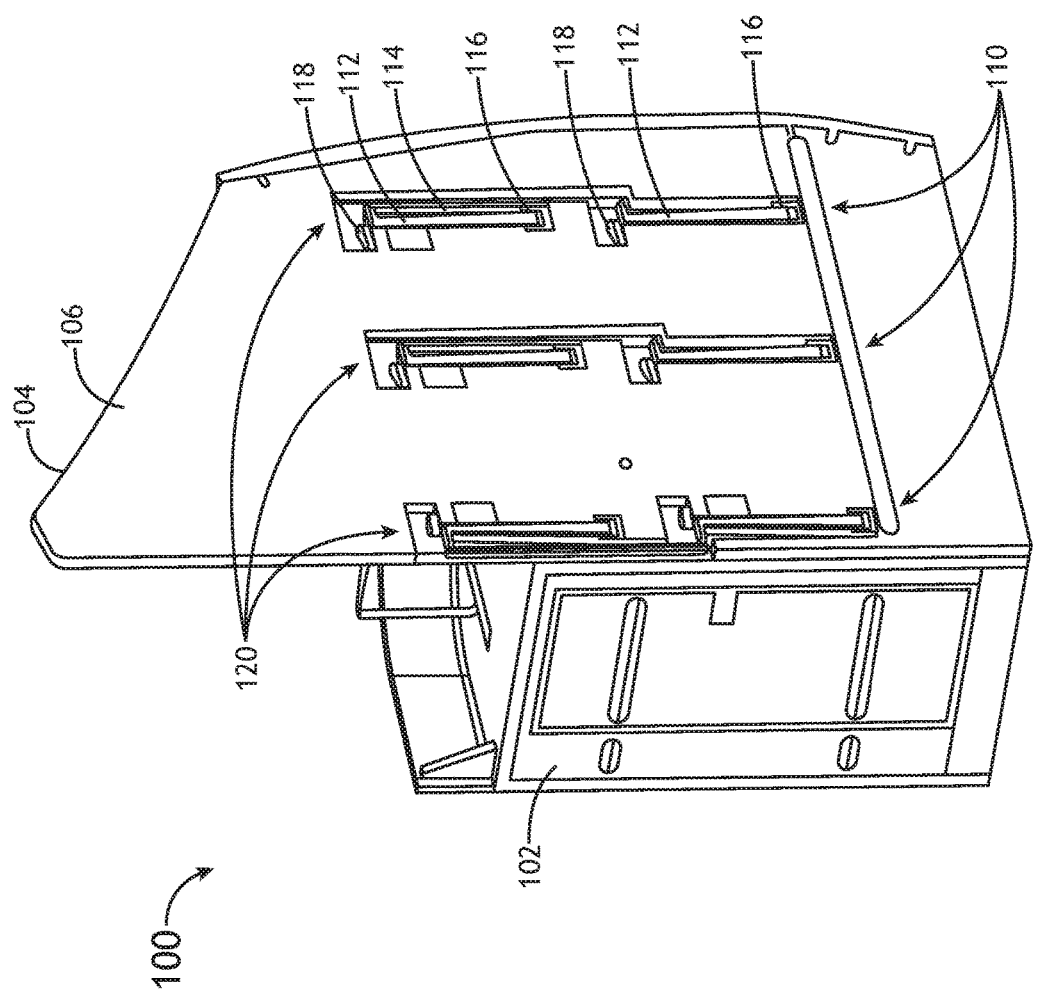
FIG. 1C illustrates a perspective view of an aircraft monument with an aircraft cart retention device and an aircraft cart, in accordance with one or more embodiments of the disclosure.
Figure 2A:
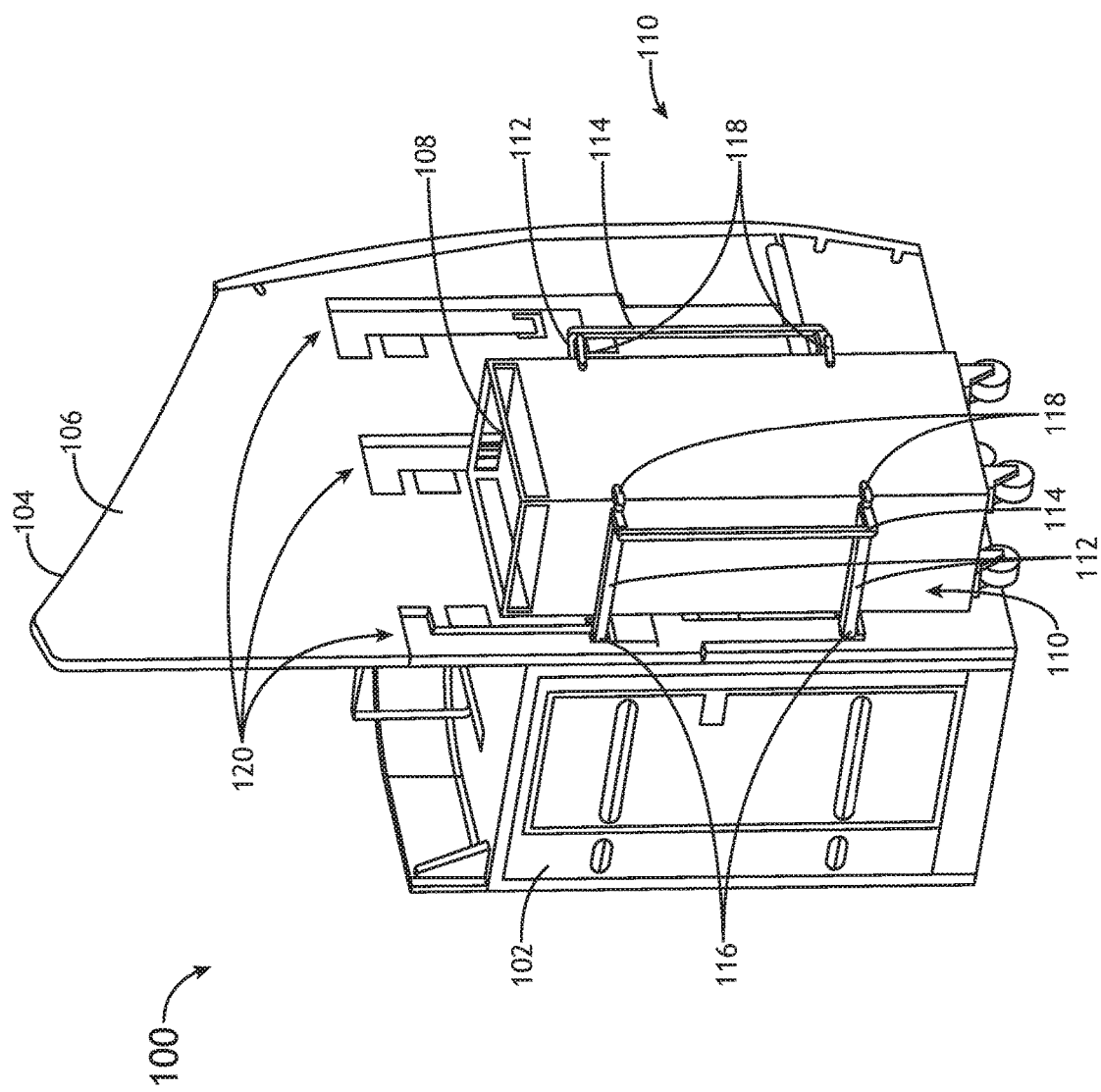
FIG. 2A illustrates a perspective view of an aircraft monument with an aircraft cart retention device and an aircraft cart, in accordance with one or more embodiments of the disclosure.
Figure 2B:
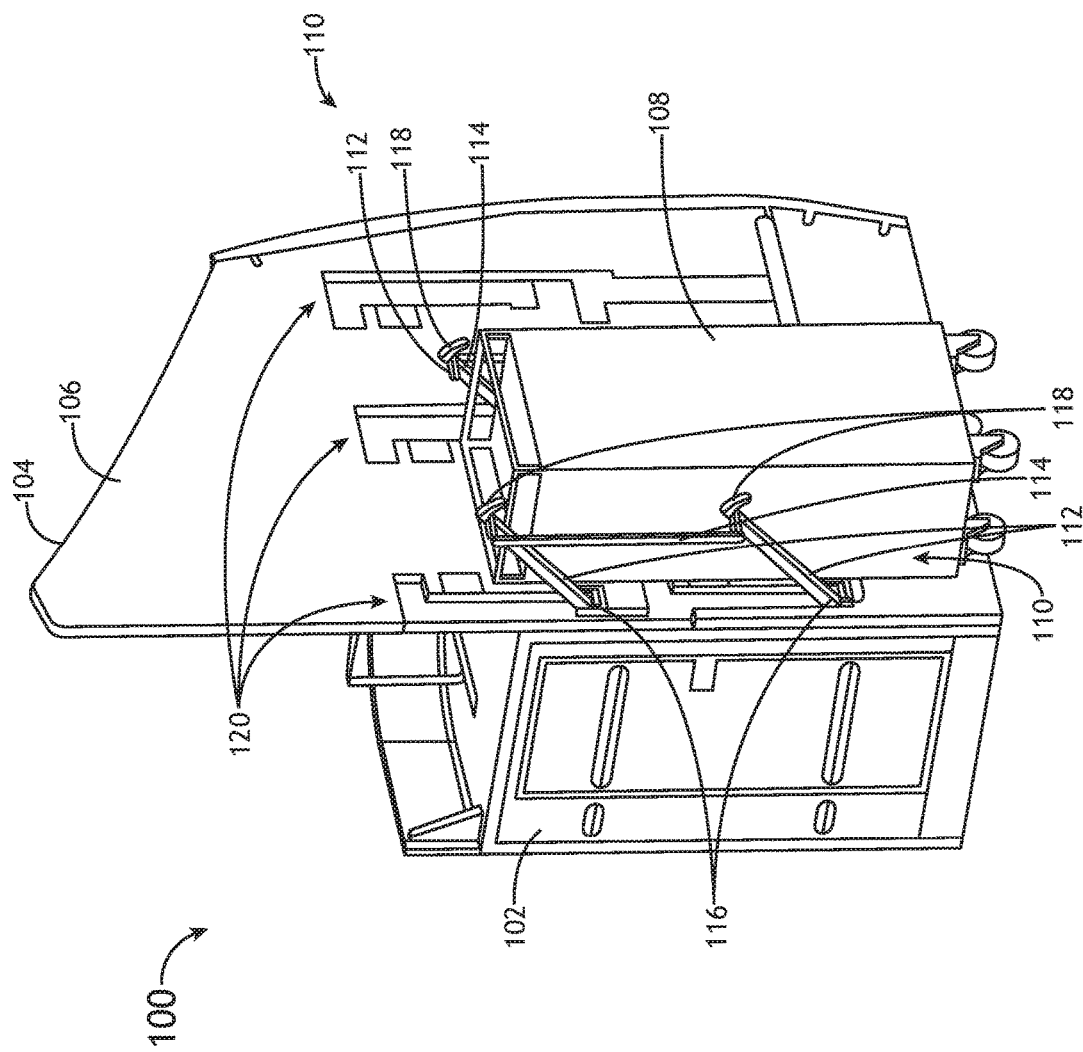
FIG. 2B illustrates a perspective view of an aircraft monument with an aircraft cart retention device and an aircraft cart, in accordance with one or more embodiments of the disclosure.
Figure 2C:
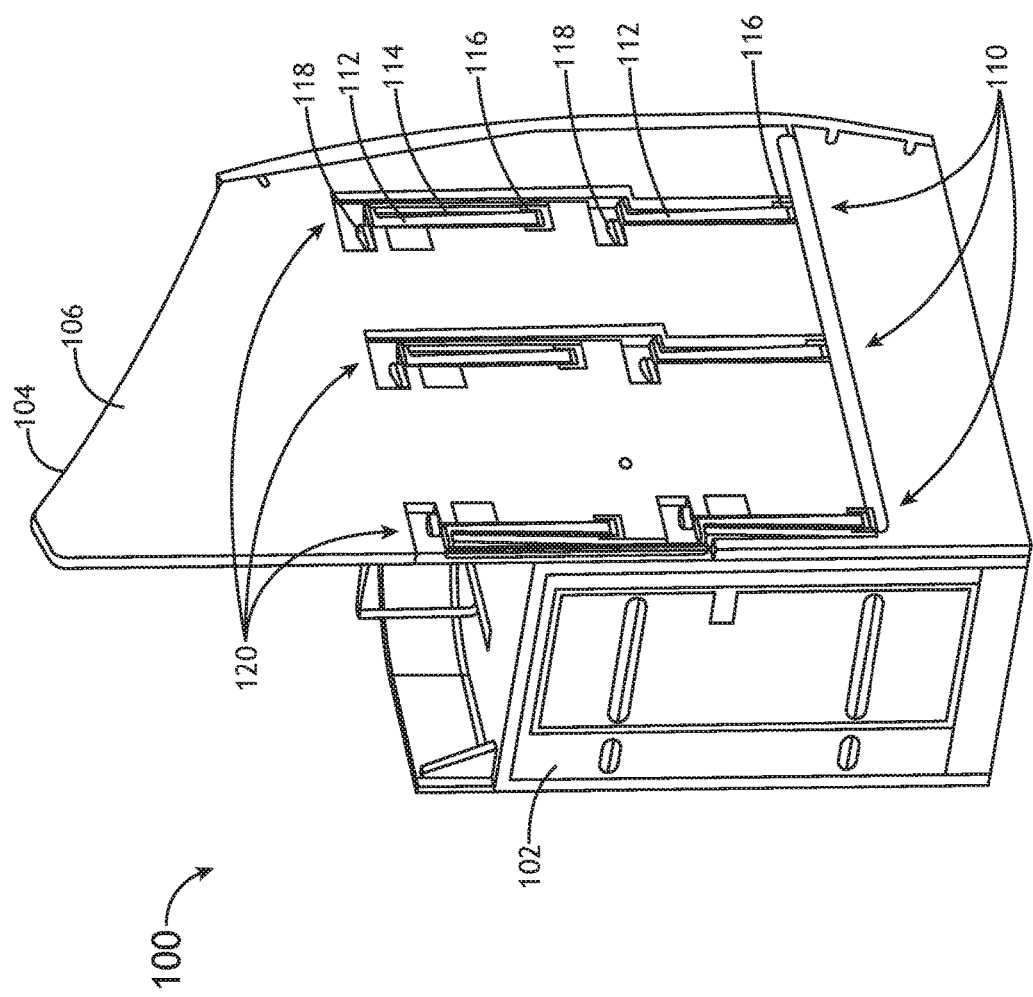
FIG. 2C illustrates a perspective view of an aircraft monument with an aircraft cart retention device and an aircraft cart, in accordance with one or more embodiments of the disclosure.
Figure 3A:
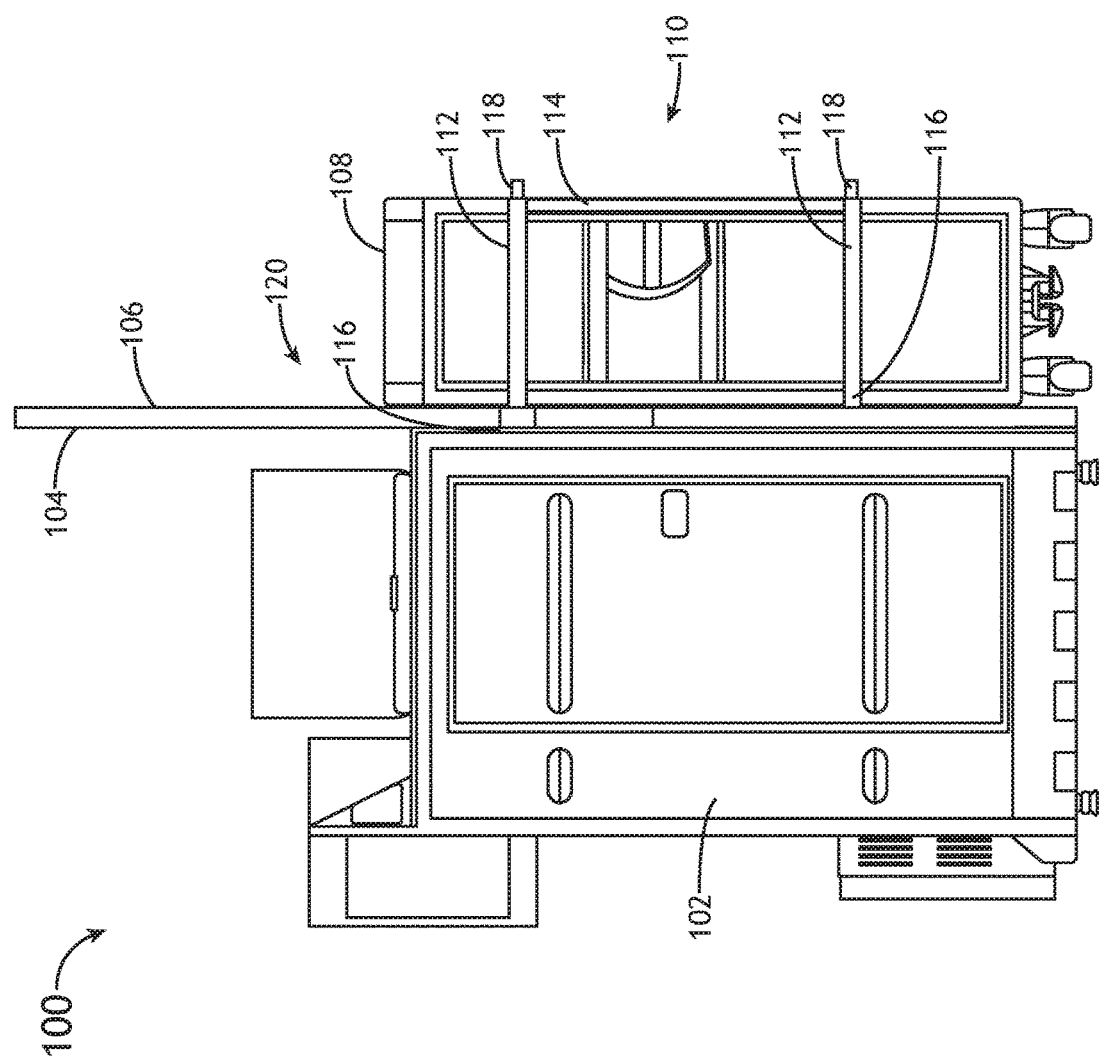
FIG. 3A illustrates a lateral view of an aircraft monument with an aircraft cart retention device and an aircraft cart, in accordance with one or more embodiments of the disclosure.
Figure 3B:
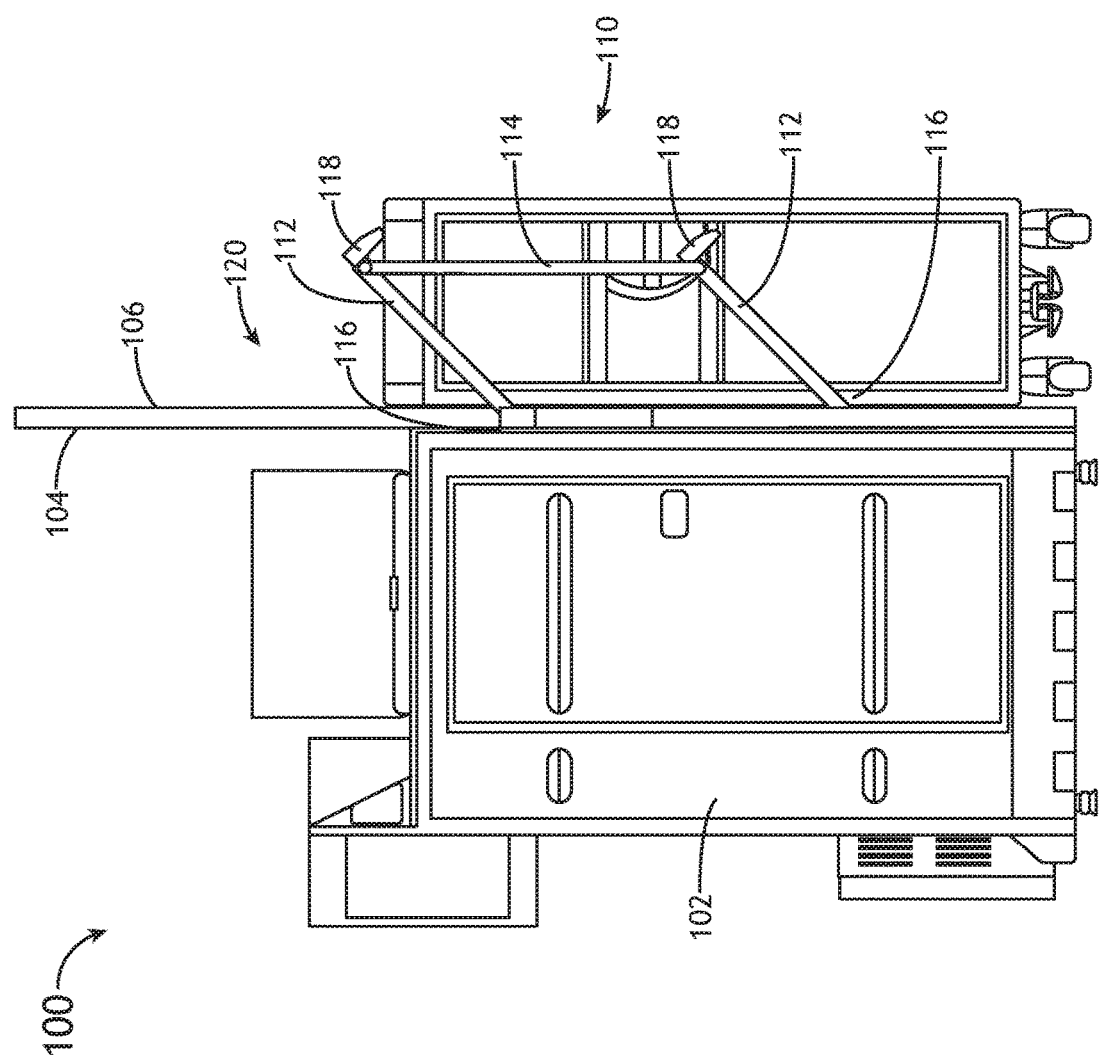
FIG. 3B illustrates a lateral view of an aircraft monument with an aircraft cart retention device and an aircraft cart, in accordance with one or more embodiments of the disclosure.
Figure 3C:
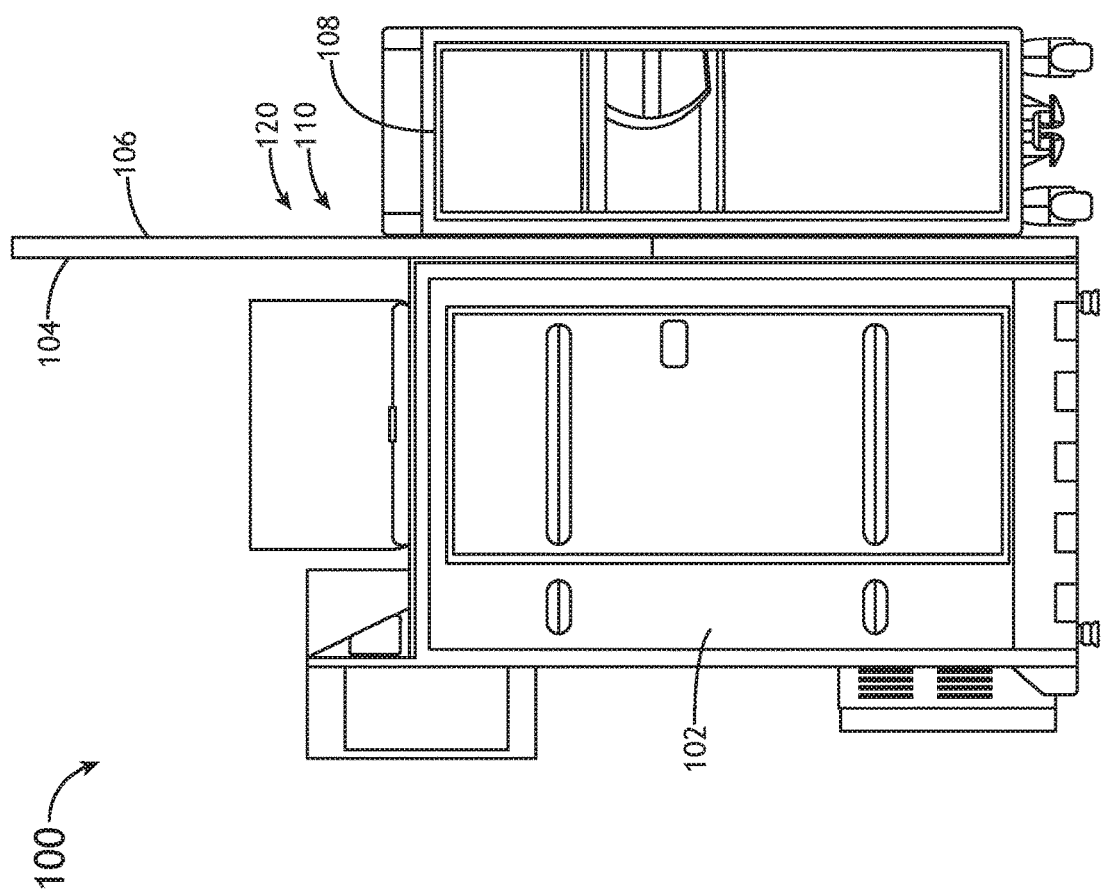
FIG. 3C illustrates a lateral view of an aircraft monument with an aircraft cart retention device and an aircraft cart, in accordance with one or more embodiments of the disclosure.

FIGS. 1A-3C in general illustrate an aircraft cart retention device 110, in accordance with one or more embodiments of the present disclosure. In particular, FIGS. 1A-1C illustrate the aircraft cart retention device 110 interacting with a full aircraft cart 108. In addition, FIGS. 2A-2C illustrate the aircraft cart retention device 110 interacting with a reduced-size aircraft cart 108. Further, FIGS. 3A-3C illustrate the aircraft cart retention device 110 interacting with a general aircraft cart 108.

The aircraft cart retention device 110 may include a linkage assembly. The linkage assembly may include one or more linkages 112. For example, the one or more linkages 112 may be horizontal or substantially horizontal (e.g., as defined when the aircraft cart retention device 110 is deployed). Where there are multiple linkages 112, the linkage assembly may include one or more connecting linkages 114 coupling the multiple linkages 112. It is noted herein the one or more connecting linkages 114 may be set at an angle relative to the one or more linkages 112 (e.g., as defined when the aircraft cart retention device 110 is deployed). For instance, the one or more connecting linkages 114 may be vertical or substantially vertical (e.g., as defined when the aircraft cart retention device 110 is deployed).

A linkage 112 may be coupled to the structure 104 via a hinge 116 mounted to or installed within the structure 104. For example, the hinge 116 may allow the linkage 112 to actuate (e.g., rotate about an axis through the hinge 116) between a stowed position and a deployed position, and vice versa. In this regard, the linkage assembly (and thus the aircraft cart retention device 110) may be capable of actuating between a stowed position and a deployed position, or vice versa.

In one non-limiting example, the linkage assembly is a four-bar linkage assembly, with the structure 104, an upper linkage 112, a lower linkage 112, and a connecting linkage 114 forming the four linkages. The upper linkage and the lower linkage 112 may actuate (e.g., rotate) together, being coupled together by the connecting linkage 114, about respective axes through respective hinges 116 in the structure 104.

Where the aircraft cart retention system includes multiple aircraft cart retention devices 110, it is noted herein the counterpart axes may be collinear (e.g., axes through the upper hinges 116 may be collinear and axes through the lower hinges 116 may be collinear, as illustrated in FIGS. 1A-1C and in FIGS. 2A-2C).

The aircraft cart retention device 110 may include one or more latches 118 configured to retain the aircraft cart 108 when the aircraft cart retention device 110 is in the deployed position. For example, the aircraft cart retention device 110 may include an upper latch 118 and a lower latch 118 on a linkage 114. For instance, the upper latch 118 may be located proximate to an upper joint coupling an upper linkage 112 and the linkage 114, and the lower latch 118 may be located proximate to a lower joint coupling a lower linkage 112 and the linkage 114. It is noted herein the upper latch 118 and the lower latch 118 may be a same defined plane or in different (e.g., offset) defined planes.

The one or more latches 118 may be positioned at one or more locations against the retained aircraft cart 108 to ensure universality with any height of aircraft cart 108. For example, the one or more latches 118 may include one or more latches 118 of a length configured to retain the aircraft cart 108 along the body of the aircraft cart 108. By way of another example, the one or more latches 118 may include one or more latches 118 of a length configured to retain the aircraft cart 108 along the cart content door and/or the body of the aircraft cart 108.

The one or more latches 118 may be configured to actuate (e.g., rotate about an axis through a linkage 112 or 114) between a closed position and an open position. For example, the closed position may be a position in which the one or more latches 118 retain the aircraft cart 108 when the aircraft cart retention device 110 is in the deployed position. By way of another example, the open position may be a position in which the one or more latches 118 allows the aircraft cart 108 to be moved from a position proximate to the exterior surface 106 of the structure 104 when the aircraft cart retention device 110 is in the stowed position.

It is noted herein the linkages 112 and/or the linkages 114 may include a handle for an operator to interact with when the linkage assembly actuates (e.g., rotates) between the stowed position and the deployed position, and vice versa.

The aircraft cart retention device 110 may be configured to stow within a corresponding cavity 120 (e.g., a groove, an indentation, cut-out, or the like). The cavity 120 may include one or more sections configured to receive one or more components of the corresponding aircraft cart retention device 110 when the aircraft cart retention device 110 is in the stowed position. For example, the cavity 120 may include one or more sections 122 configured to receive the one or more linkages 112. By way of another example, the cavity 120 may include one or more sections 124 configured to receive the one or more linkages 114. By way of another example, the cavity 120 may include one or more sections 126 configured to receive the one or more latches 118.

Although embodiments of the disclosure illustrate separate sections 122, 124, 126 of a cavity 120, it is noted herein at least some of the sections of the cavity 120 may be combined such that components of the corresponding aircraft cart retention device 110 may share a section of the cavity 120. Therefore, the above description should not be interpreted as a limitation on the present disclosure but merely an illustration.

Although embodiments of the disclosure illustrate separate cavities 120, it is noted herein at least some of the cavities 120 may be interconnected within the exterior surface 106 of the structure 104. Therefore, the above description should not be interpreted as a limitation on the present disclosure but merely an illustration.

Referring now to FIG. 1A-1C, a pair of aircraft cart retention devices 110 may retain a full-size aircraft cart 108. Each aircraft cart retention device 110 may actuate (e.g., rotate) from a deployed position (e.g., as illustrated in FIG. 1A), through one or more intermediate positions (e.g., as illustrated in FIG. 1B), and to a stowed position (e.g., as illustrated in FIG. 1C). Although not shown, it should be understood each aircraft cart retention device 110 may similarly actuate (e.g., rotate) from the stowed position, through the one or more intermediate positions, and to the deployed position.

Referring now to FIG. 2A-2C, a second pair of aircraft cart retention devices 110 may retain a reduced-size aircraft cart 108. Each aircraft cart retention device 110 may actuate (e.g., rotate) from a deployed position (e.g., as illustrated in FIG. 2A) through one or more intermediate positions (e.g., as illustrated in FIG. 2B) to a stowed position (e.g., as illustrated in FIG. 2C). Although not shown, it should be understood each aircraft cart retention device 110 may similarly actuate (e.g., rotate) from the stowed position, through the one or more intermediate positions, and to the deployed position.

To maintain universality of the aircraft cart retention system, at least three aircraft cart retention devices 110 may need to be installed within the aircraft cabin 100. For example, a first aircraft cart retention device 110 may be installed for both a short a full-size or a reduced-size galley cart 108 (e.g., as illustrated in FIGS. 1A-3C), a second aircraft cart retention device 110 may be installed for a full-size galley cart 108 (e.g., as illustrated in FIGS. 1A-1C), and a third aircraft cart retention device 110 may be installed for a reduced-size galley cart 108 (e.g., as illustrated in FIGS. 2A-2C). For instance, the third aircraft cart retention device 110 may be installed at a location configured to retain one or multiple reduced-size galley carts 108 (e.g., with enough latches 118 to retain the one or multiple reduced-size galley carts 108. It is noted herein, however, the aircraft cart retention system is not limited to the three aircraft cart retention devices 110 (e.g., as illustrated in FIGS. 1A-2C), but instead may include any number of aircraft cart retention devices 110.

It is noted herein retaining the aircraft cart 108 within the aircraft cart retention system may require the following steps: fold down an aircraft cart retention device 110 specific to the aircraft cart 108 size (e.g., wide or narrow), park the aircraft cart 108, fold down the shared aircraft cart retention device 110, and turn the latches 118 specific to the aircraft cart 108 height (e.g., tall or short). Although not shown, it should be understood the above order of steps is non-limiting, and that removing the aircraft cart 108 may require the steps in a reverse order from those listed above. In addition, it should be understood the above order of steps is non-limiting, and retaining and/or removing the aircraft cart 108 may require more or fewer steps performed in a same or different order than those listed above.

The cavity 120 may be partially or fully cut-out from the structure 104. In general, the cavity 120 may be configured to receive a corresponding aircraft cart retention device 110 such that the aircraft cart retention device 110 is inset within the structure 104 when the aircraft cart retention device 110 is in the stowed position (e.g., as illustrated in FIGS. 1C, 2C, and 3C). In this regard, the aircraft cart retention device 110 may not interfere (e.g., stick out into) a floor area of the aircraft cabin 100 when the aircraft cart 108 is not being retained by the aircraft cart retention device 110. It is noted herein, however, the aircraft cart retention device 110 may be configured to stow flush against the exterior surface 106 of the structure 104.

It is noted herein the linkages 112, the connecting linkages 114, and the linkage assembly may be considered members 112, connecting members 114, and a member assembly, respectively, for purposes of the present disclosure.

Although embodiments of the disclosure illustrate the aircraft cart retention devices 110 being mounted to or installed within the structure 104, it is noted herein the structure 104 is non-limiting and the aircraft cart retention devices 110 may be mounted to or installed within any structure within the aircraft cabin 100. Therefore, the above description should not be interpreted as a limitation on the present disclosure but merely an illustration.

Figure 4A:
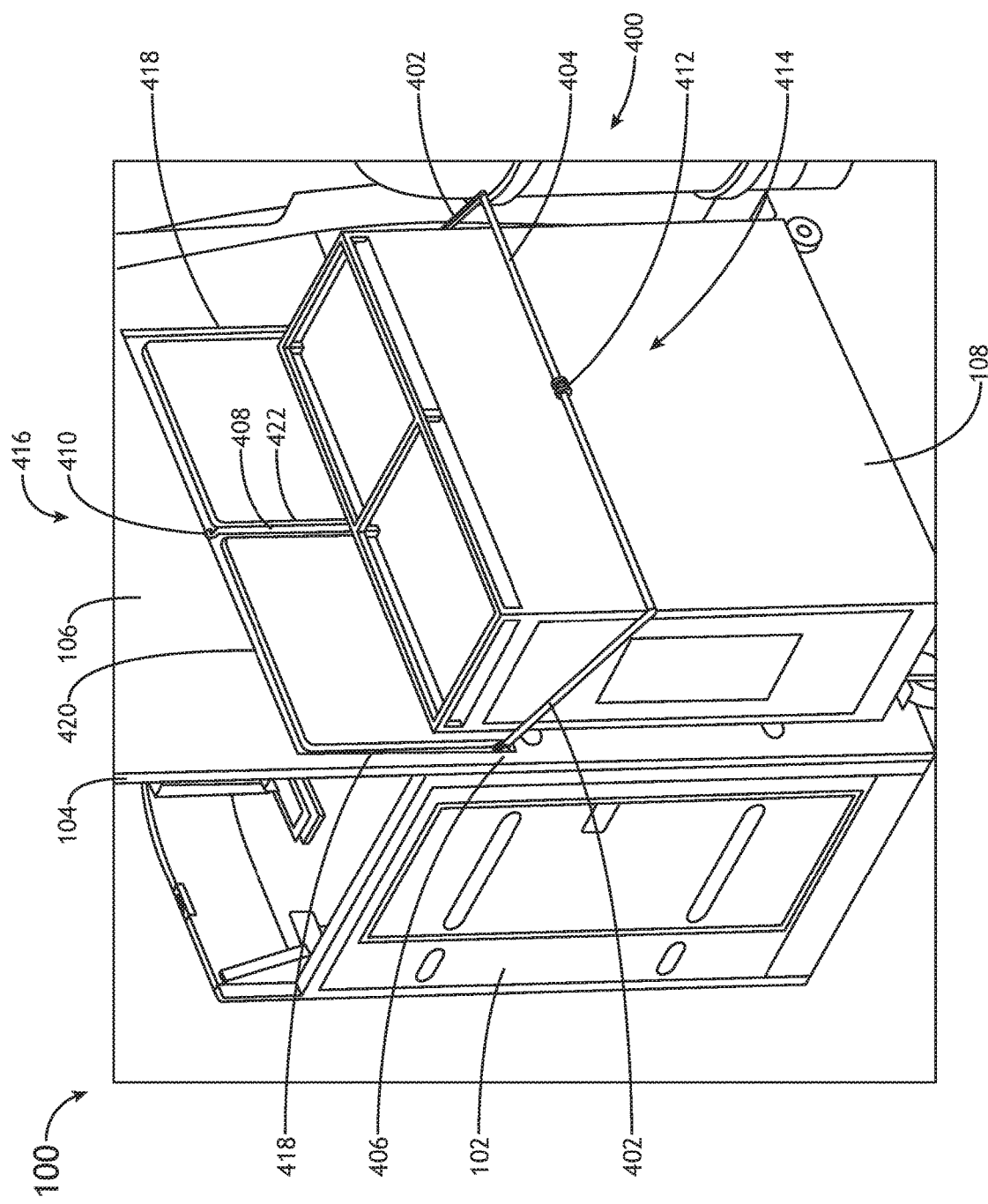
FIG. 4A illustrates a perspective view of an aircraft monument with an aircraft cart retention device and an aircraft cart, in accordance with one or more embodiments of the disclosure.
Figure 4B:
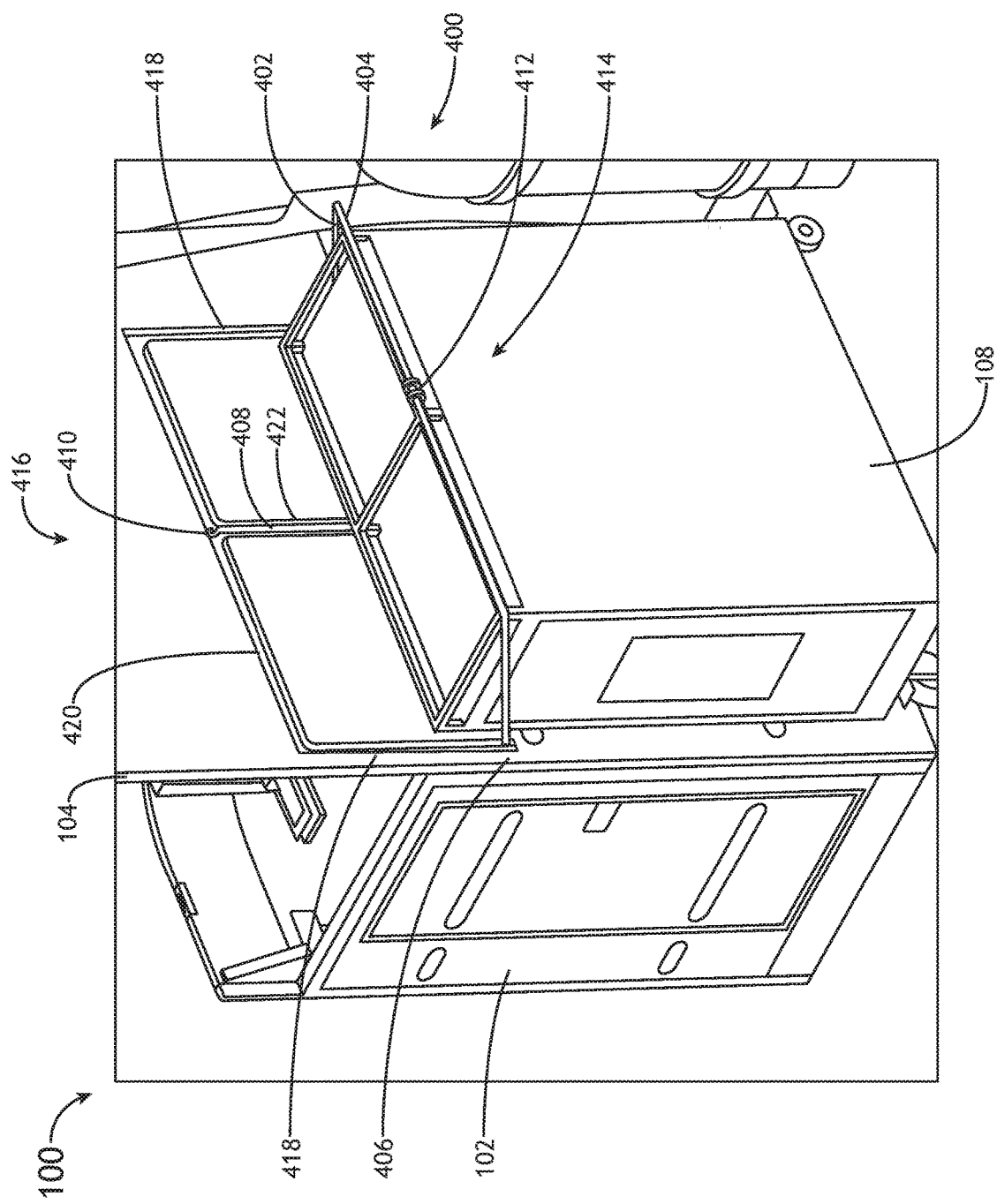
FIG. 4B illustrates a perspective view of an aircraft monument with an aircraft cart retention device and an aircraft cart, in accordance with one or more embodiments of the disclosure.
Figure 4C:
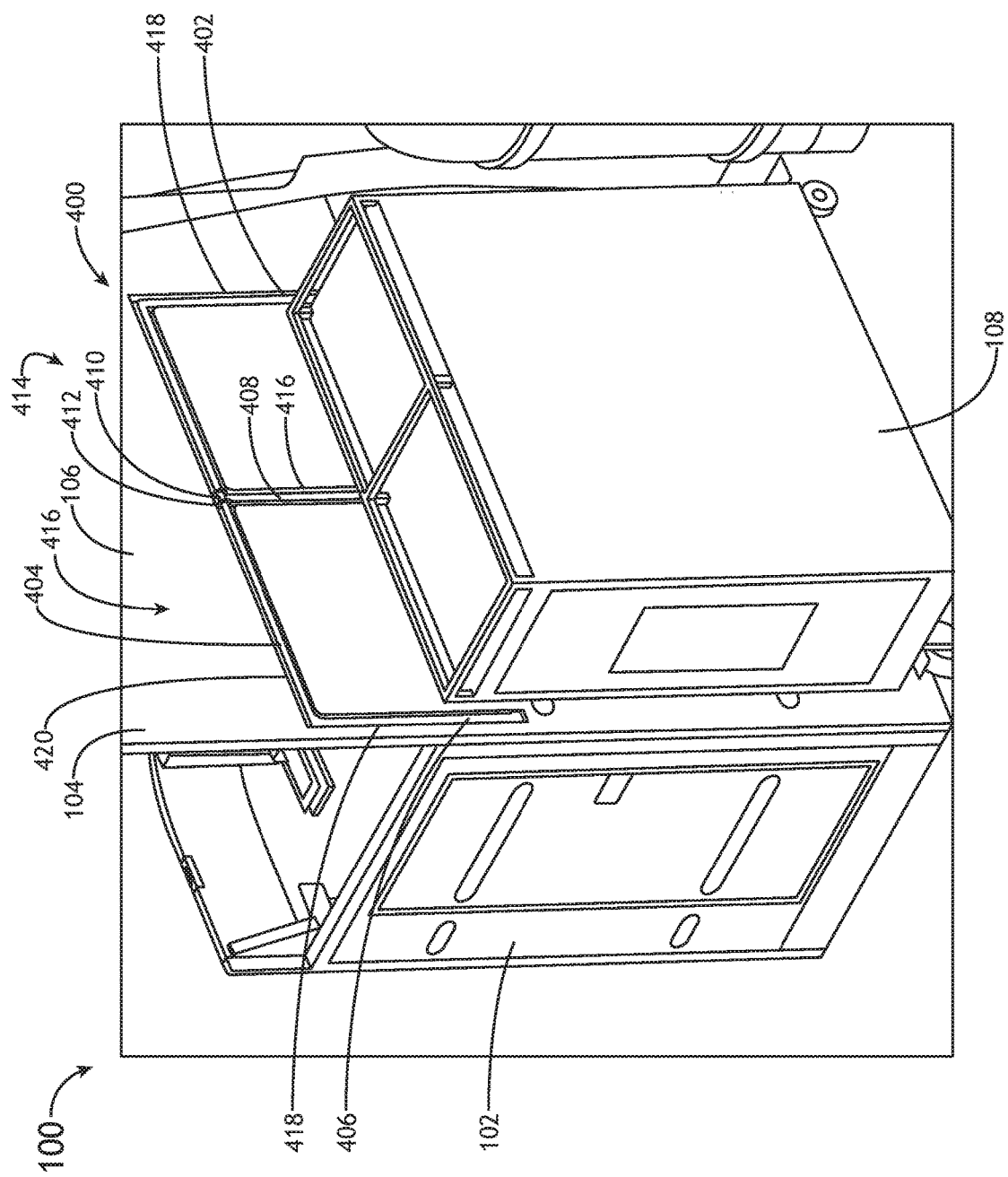
FIG. 4C illustrates a perspective view of an aircraft monument with an aircraft cart retention device and an aircraft cart, in accordance with one or more embodiments of the disclosure.
Figure 5A:
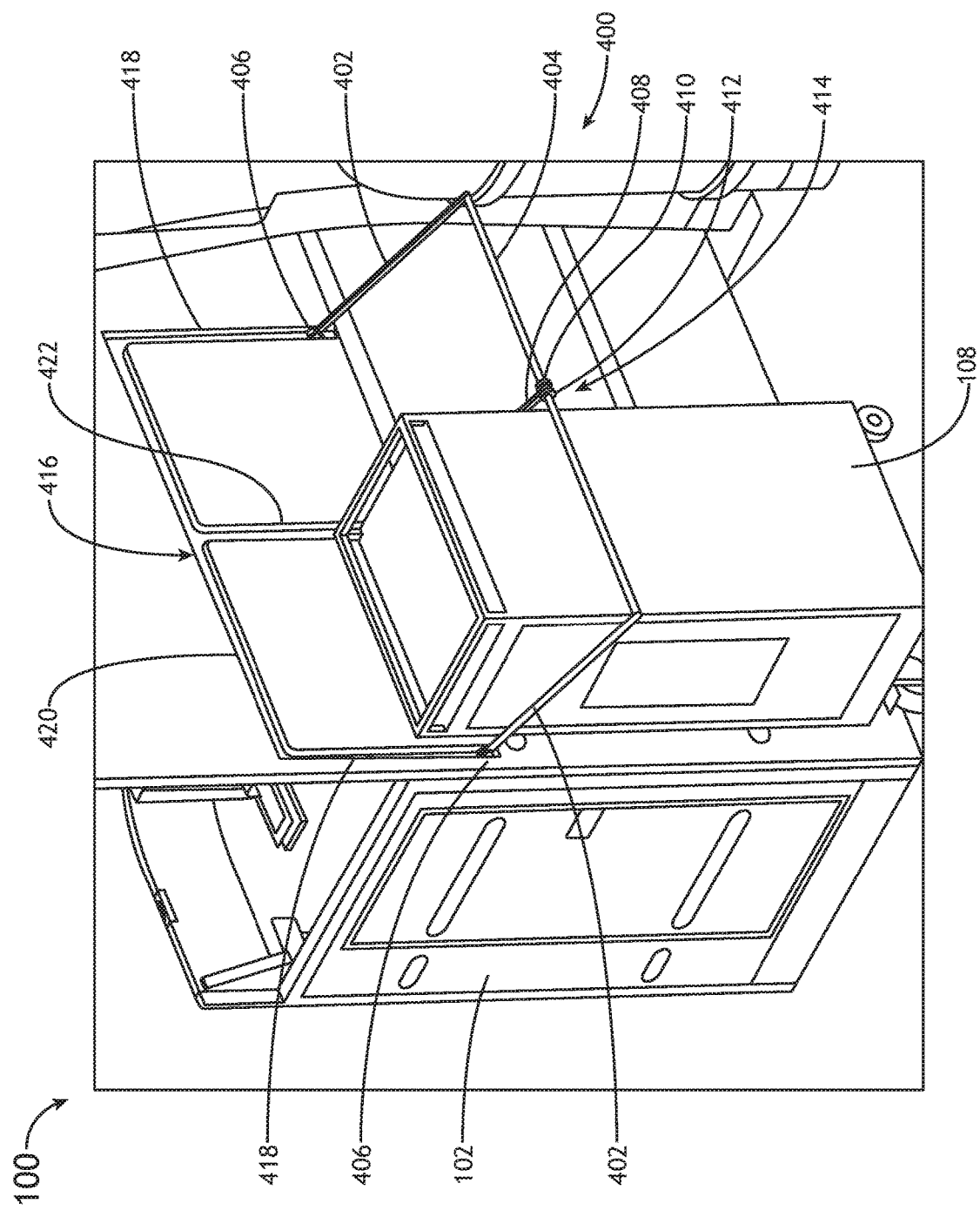
FIG. 5A illustrates a perspective view of an aircraft monument with an aircraft cart retention device and an aircraft cart, in accordance with one or more embodiments of the disclosure.
Figure 5B:
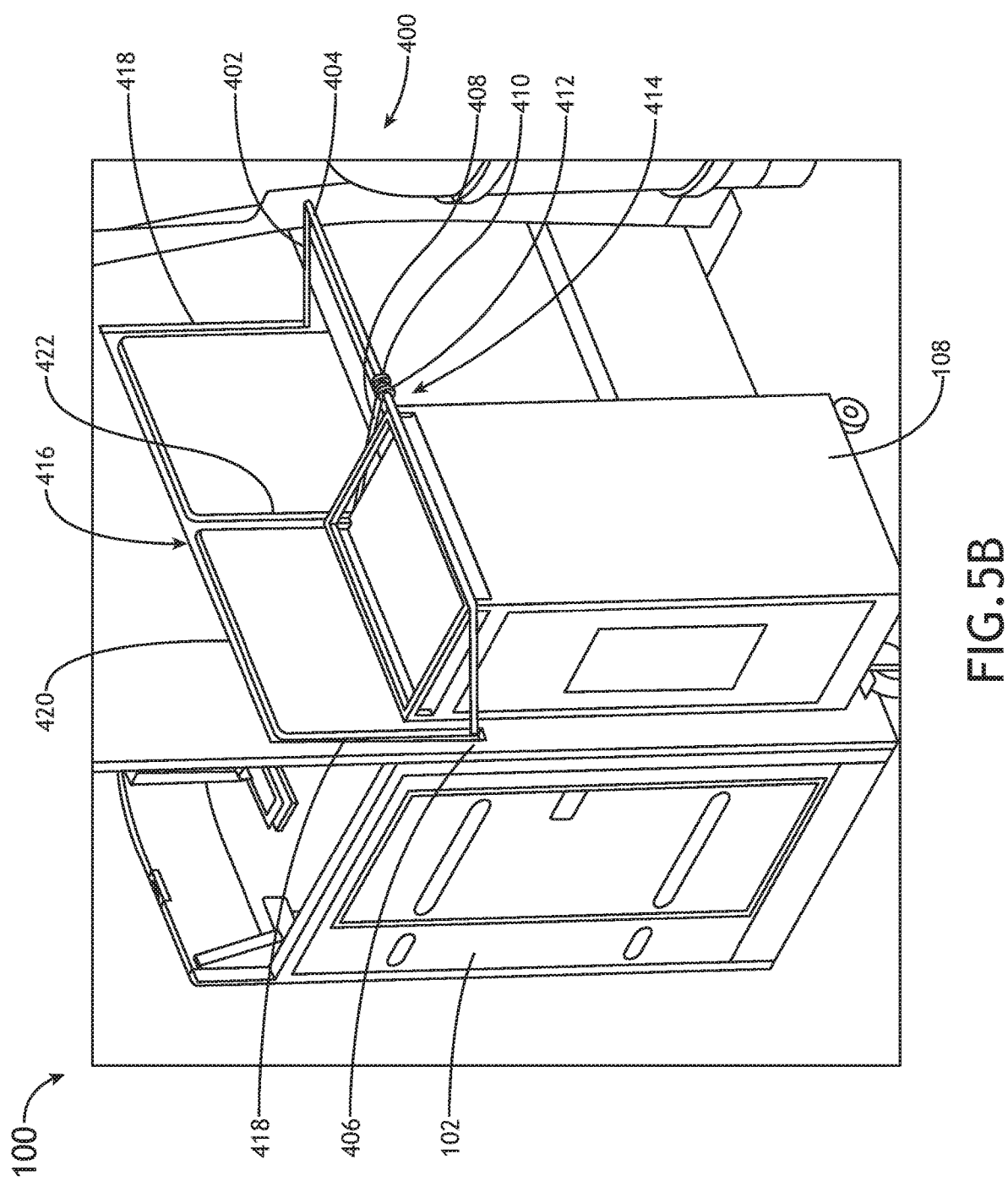
FIG. 5B illustrates a perspective view of an aircraft monument with an aircraft cart retention device and an aircraft cart, in accordance with one or more embodiments of the disclosure.
Figure 5C:
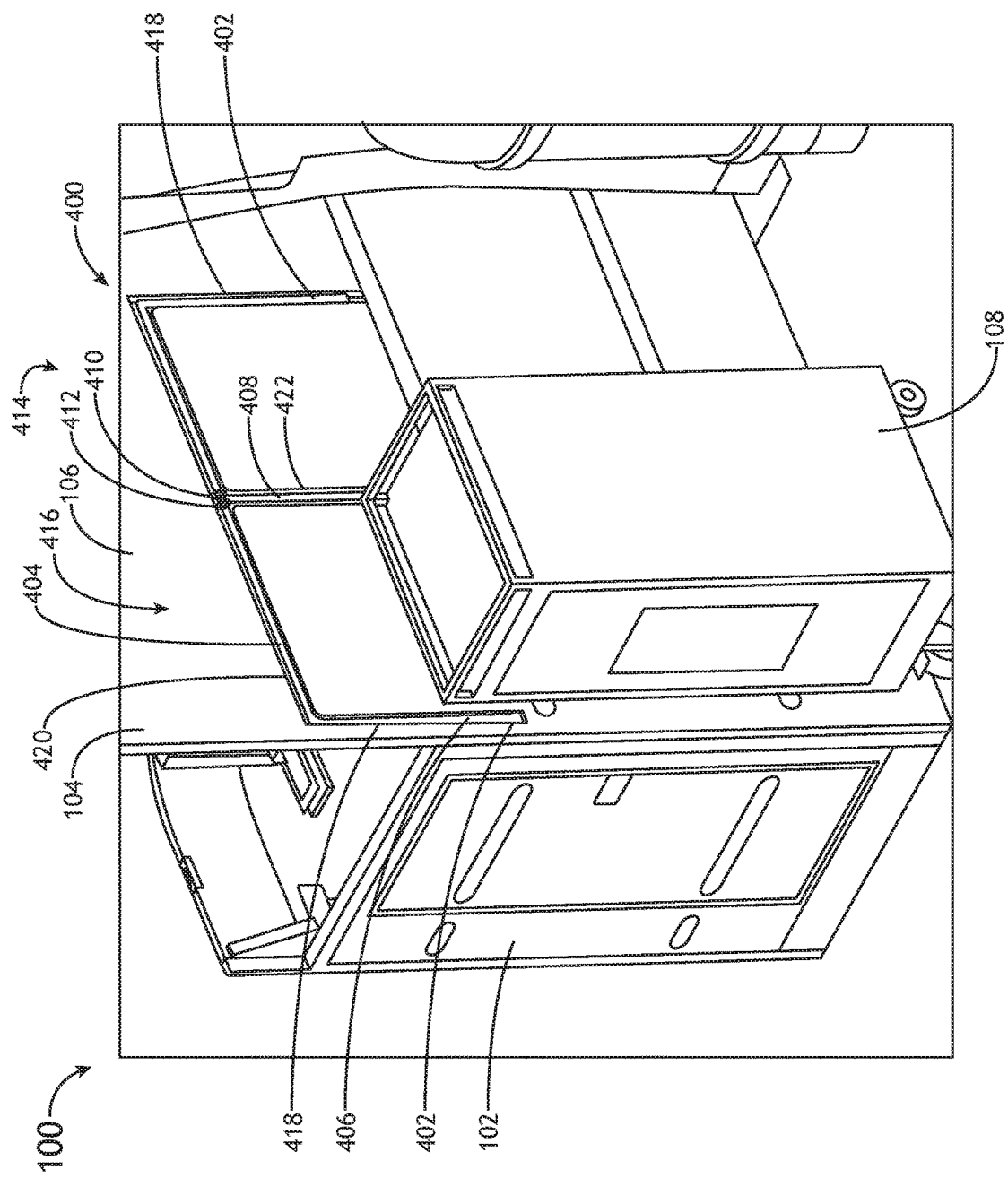
FIG. 5C illustrates a perspective view of an aircraft monument with an aircraft cart retention device and an aircraft cart, in accordance with one or more embodiments of the disclosure.
Figure 6B:
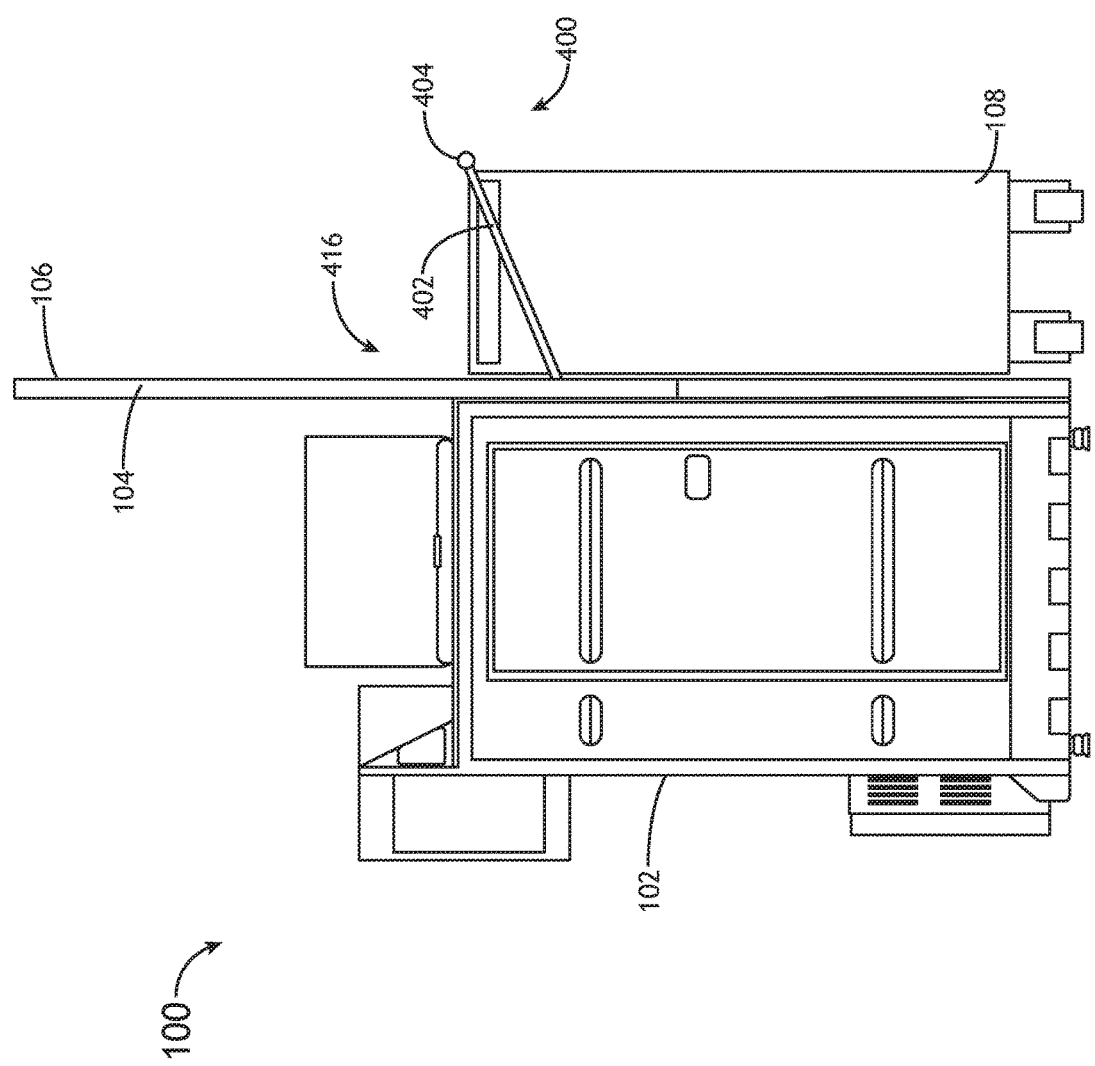
FIG. 6B illustrates a lateral view of an aircraft monument with an aircraft cart retention device and an aircraft cart, in accordance with one or more embodiments of the disclosure.

FIGS. 4A-6C in general illustrate an aircraft cart retention device 400, in accordance with one or more embodiments of the present disclosure. In particular, FIGS. 4A-4C illustrate the aircraft cart retention device 400 interacting with a full aircraft cart 108. In addition, FIGS. 5A-5C illustrate the aircraft cart retention device 400 interacting with a reduced-size aircraft cart 108. Further, FIGS. 6A-6C illustrate the aircraft cart retention device 400 interacting with a general aircraft cart 108.

The aircraft cart retention device 400 may include a bar assembly. The bar assembly may include one or more primary bars 402 set at an angle to the exterior surface 106 of the structure 104. For instance, the one or more primary bars 402 may be set perpendicular or substantially perpendicular to the exterior surface 106 of the structure 104. Where there are multiple primary bars 402, the bar assembly may include one or more auxiliary bars 404 coupled to and set at an angle to the multiple primary bars 402. For instance, the one or more auxiliary bars 404 may be set perpendicular or substantially perpendicular to the multiple primary bars 402 (e.g., such that the one or more auxiliary bars 404 are set parallel or substantially parallel to the exterior surface 106 of the structure 104).

A primary bar 402 may be coupled to the structure 104 via a hinge 406 mounted to or installed within the structure 104. For example, the hinge 406 may allow the primary bar 402 to actuate (e.g., rotate about an axis through the bar 402 or 404) between a stowed position and a deployed position, and vice versa. In this regard, the bar assembly (and thus the aircraft cart retention device 400) may be capable of rotating between a stowed position and a deployed position, or vice versa.

In one non-limiting example, the two primary bars 402, an auxiliary bar 404, and the exterior surface 106 of the structure 104 may define a confined space in which a full-size galley cart 108 may be retained. The primary bars 402 may actuate (e.g., rotate) together, being coupled together by the auxiliary bar 404, about respective axes through respective hinges 406 in the structure 104.

It is noted herein the axes through the hinges 406 may be collinear (e.g., as illustrated in FIGS. 4A-4C and in FIGS. 5A-5C).

The bar assembly may be configured to actuate (e.g., rotate about axes through the hinges 406 through a range of angles) to ensure universality with any height of aircraft cart 108. For example, the angles may range from 0 degrees (e.g., as defined when the aircraft cart retention device 400 is in the stowed position) to greater than 90 degrees.

The bar assembly may include a mechanical detent to hold the bar assembly in the deployed position in addition to gravity. For example, the mechanical detent may be a physical structure requiring an increased amount of force to overcome in addition to a lifting force needed to raise the aircraft cart retention device 400 to the stowed position. By way of another example, the mechanical detent may include a friction spring or other spring-like component installed within or proximate to the one or more hinges 406.

To maintain universality of the aircraft cart retention system, the bar assembly may include one or more separator bars 408. The one or more separator bars 408 may be configured to separate a confined space for a full-size galley cart 108 (e.g., as illustrated in FIGS. 4A-4C) into one or more smaller confined spaces for one or more reduced-size galley carts 108 (e.g., as illustrated in FIGS. 5A-5C). The one or more separator bars 408 may be independently actuatable from the one or more primary bars 402 and/or the one or more auxiliary bars 404. The one or more separator bars 408 may be configured to couple to the one or more primary bars 402 and/or the one or more auxiliary bars 404. For example, the one or more separator bars 408 may include a hook 410 configured to couple to a mount point 412 on an auxiliary bar 404. It is noted herein the hook 410 may be considered a first component of an interlocking assembly 414, and the mount point 412 may be considered a second component of the interlocking assembly 414. In addition, it is noted herein the aircraft art retention device 400 is not limited to the hook 410 and the mount point 412, but may instead include any numbers of components for the interlocking assembly 414. For example, the auxiliary bar 404 may include a set of collars surrounding the mount point 412 and configured to prevent the hook 410 from sliding on the auxiliary bar 404.

It is noted herein the primary bars 402 and/or the auxiliary bars 404 may include a handle for an operator to interact with when the bar assembly actuate (e.g., rotates) between the stowed position and the deployed position, and vice versa.

The aircraft cart retention device 400 may be configured to stow within a corresponding cavity 416 (e.g., a groove, indentation, cut-out, or the like). The cavity 416 may include one or more sections configured to receive one or more components of the corresponding aircraft cart retention device 400 when the aircraft cart retention device 400 is in the stowed position. For example, the cavity 416 may include one or more sections 418 configured to receive the one or more primary bars 402. By way of another example, the cavity 416 may include one or more sections 420 configured to receive the one or more auxiliary bars 404. By way of another example, the cavity 414 may include one or more sections 422 configured to receive the one or more separator bars 408.

Although embodiments of the disclosure illustrate separate sections 418, 420, 422 of a cavity 416, it is noted herein at least some of the sections of the cavity 416 may be combined such that components of the corresponding aircraft cart retention device 400 may share a section of the cavity 416. Therefore, the above description should not be interpreted as a limitation on the present disclosure but merely an illustration.

Referring now to FIG. 4A-4C, the aircraft cart retention device 400 may retain a full-size aircraft cart 108. The aircraft cart retention device 400 may actuate (e.g., rotate)

from a deployed position (e.g., as illustrated in FIG. 4A), through one or more intermediate positions (e.g., as illustrated in FIG. 4B), and to a stowed position (e.g., as illustrated in FIG. 4C). Although not shown, it should be understood each aircraft cart retention device 400 may similarly actuate (e.g., rotate) from the stowed position, through the one or more intermediate positions, and to the deployed position.

Referring now to FIG. 5A-5C, the aircraft cart retention device 400 including the one or more separator bars 408 may retain a reduced-size aircraft cart 108. The aircraft cart retention device 400 including the one or more separator bars 408 may actuate (e.g., rotate) from a deployed position (e.g., as illustrated in FIG. 5A) through one or more intermediate positions (e.g., as illustrated in FIG. 5B) to a stowed position (e.g., as illustrated in FIG. 5C). Although not shown, it should be understood each aircraft cart retention device 400 may similarly actuate (e.g., rotate) from the stowed position, through the one or more intermediate positions, and to the deployed position.

It is noted herein retaining the aircraft cart 108 within the aircraft cart retention system may require the following steps: parking the aircraft cart 108, pull down the aircraft cart retention device 400 (e.g., either with or without the one or more separator bars 408, depending on the aircraft cart 108). Although not shown, it should be understood the above order of steps is non-limiting, and that removing the aircraft cart 108 may require the steps in a reverse order from those listed above. In addition, it should be understood the above order of steps is non-limiting, and retaining and/or removing the aircraft cart 108 may require more or fewer steps performed in a same or different order than those listed above.

The cavity 416 may be partially or fully cut-out from the structure 104. In general, the cavity 416 may be configured to receive a corresponding aircraft cart retention device 400 such that the aircraft cart retention device 400 is inset within the structure 104 when the aircraft cart retention device 400 is in the stowed position (e.g., as illustrated in FIGS. 4C, 5C, and 6C). In this regard, the aircraft cart retention device 400 may not interfere (e.g., stick out into) a floor area of the aircraft cabin 100 when the aircraft cart 108 is not being retained by the aircraft cart retention device 400. It is noted herein, however, the aircraft cart retention device 400 may be configured to stow flush against the exterior surface 106 of the structure 104.

It is noted herein the primary bars 402, the auxiliary bars 404, the separator bars 408, and the bar assembly may be considered primary members 402, auxiliary members 404, separator members 408, and a member assembly, respectively, for purposes of the present disclosure.

Although embodiments of the disclosure illustrate the aircraft cart retention devices 400 being mounted to or installed within the structure 104, it is noted herein the structure 104 is non-limiting and the aircraft cart retention devices 400 may be mounted to or installed within any structure within the aircraft cabin 100. Therefore, the above description should not be interpreted as a limitation on the present disclosure but merely an illustration.

Figure 7A:
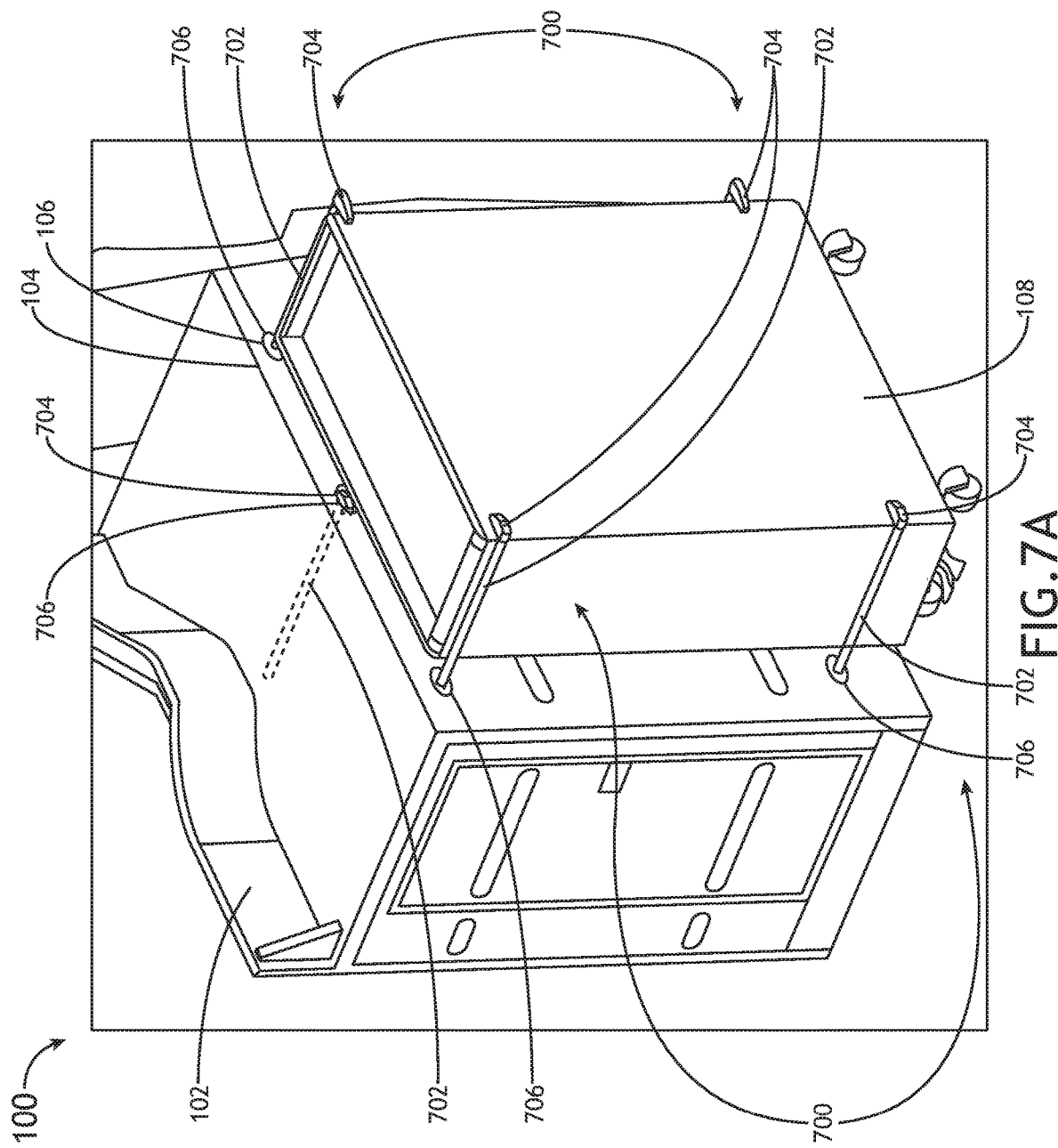
FIG. 7A illustrates a perspective view of an aircraft monument with an aircraft cart retention device and an aircraft cart, in accordance with one or more embodiments of the disclosure.
Figure 7B:
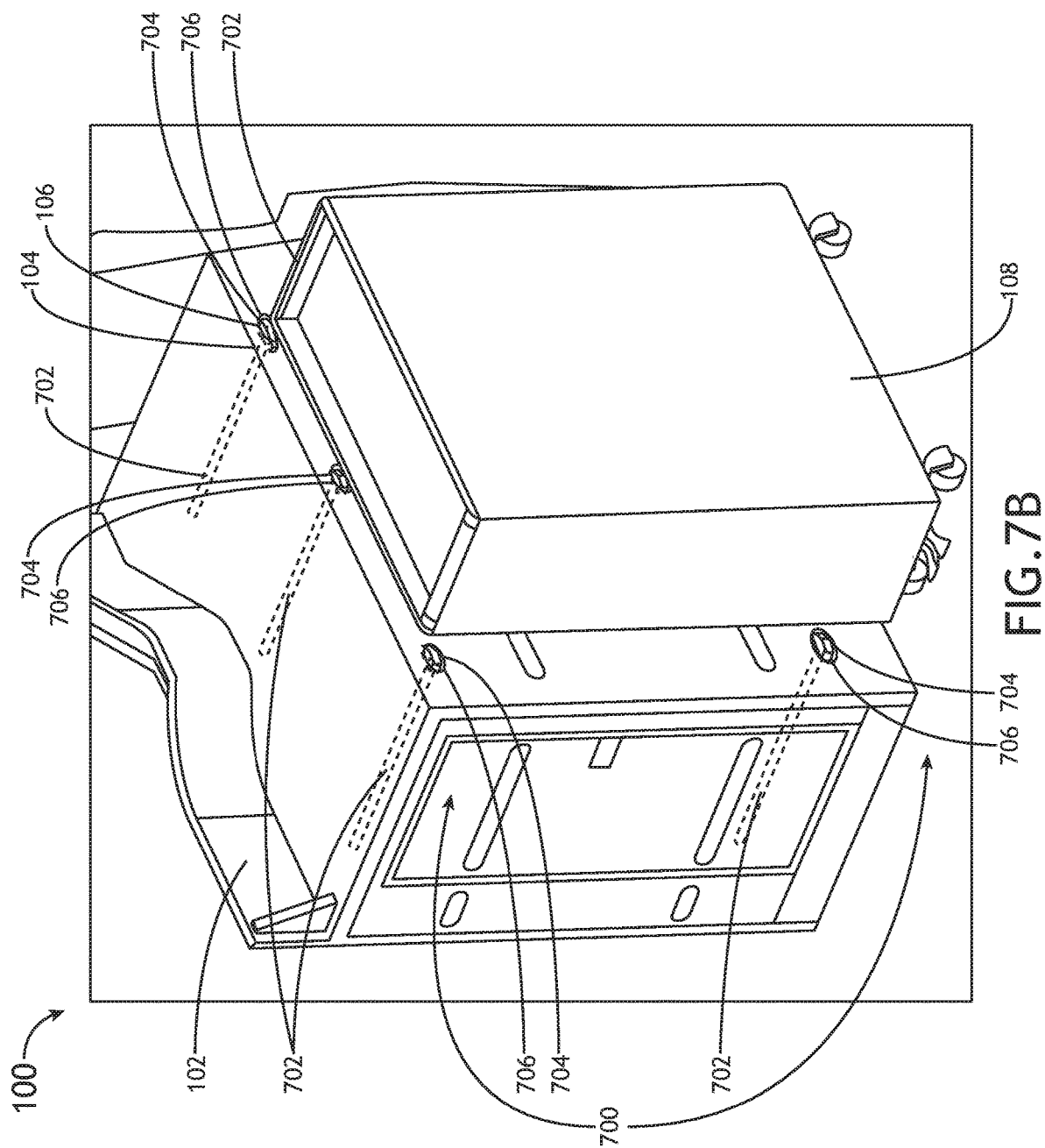
FIG. 7B illustrates a perspective view of an aircraft monument with an aircraft cart retention device and an aircraft cart, in accordance with one or more embodiments of the disclosure.
Figure 8A:
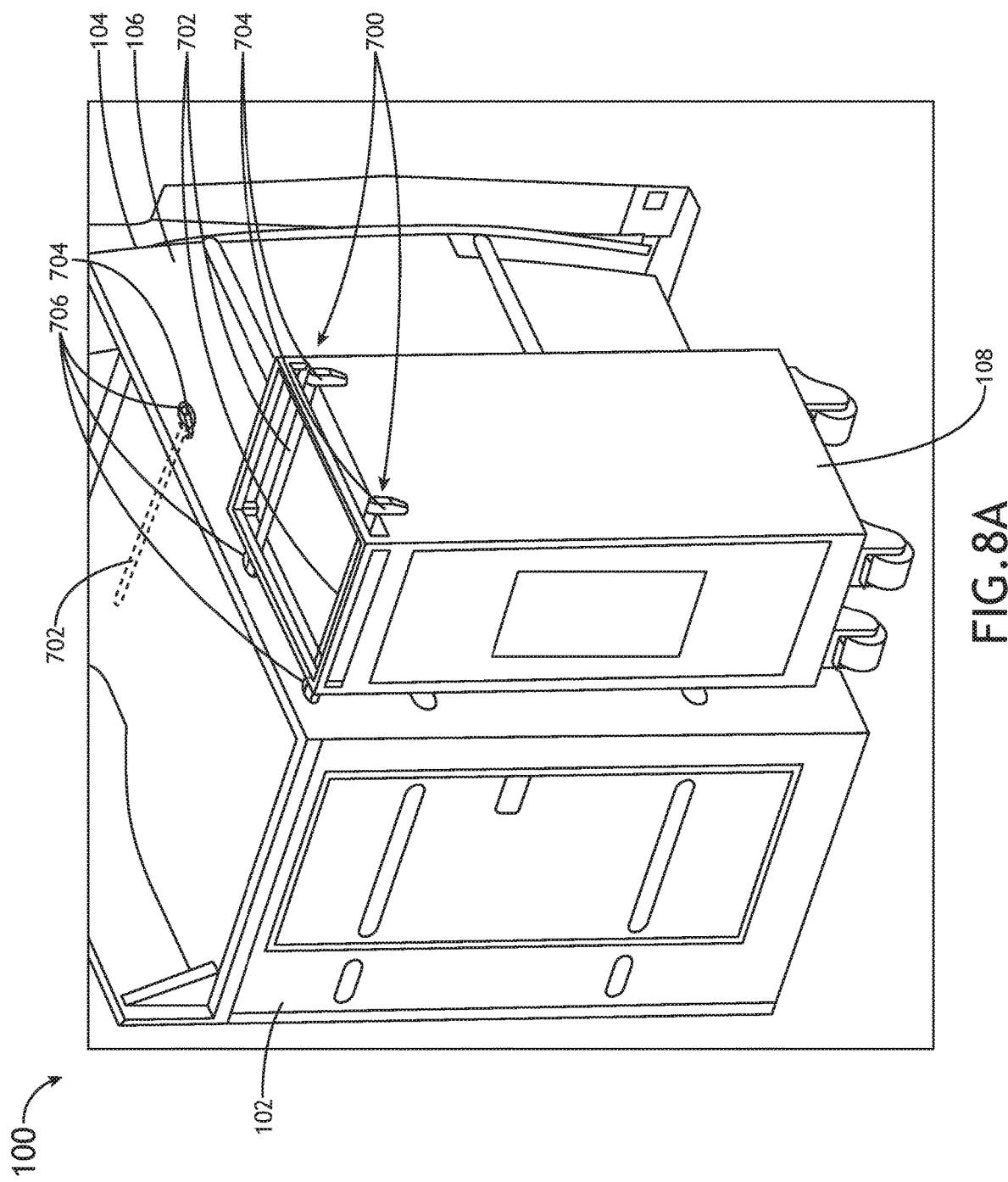
FIG. 8A illustrates a perspective view of an aircraft monument with an aircraft cart retention device and an aircraft cart, in accordance with one or more embodiments of the disclosure.
Figure 8B:
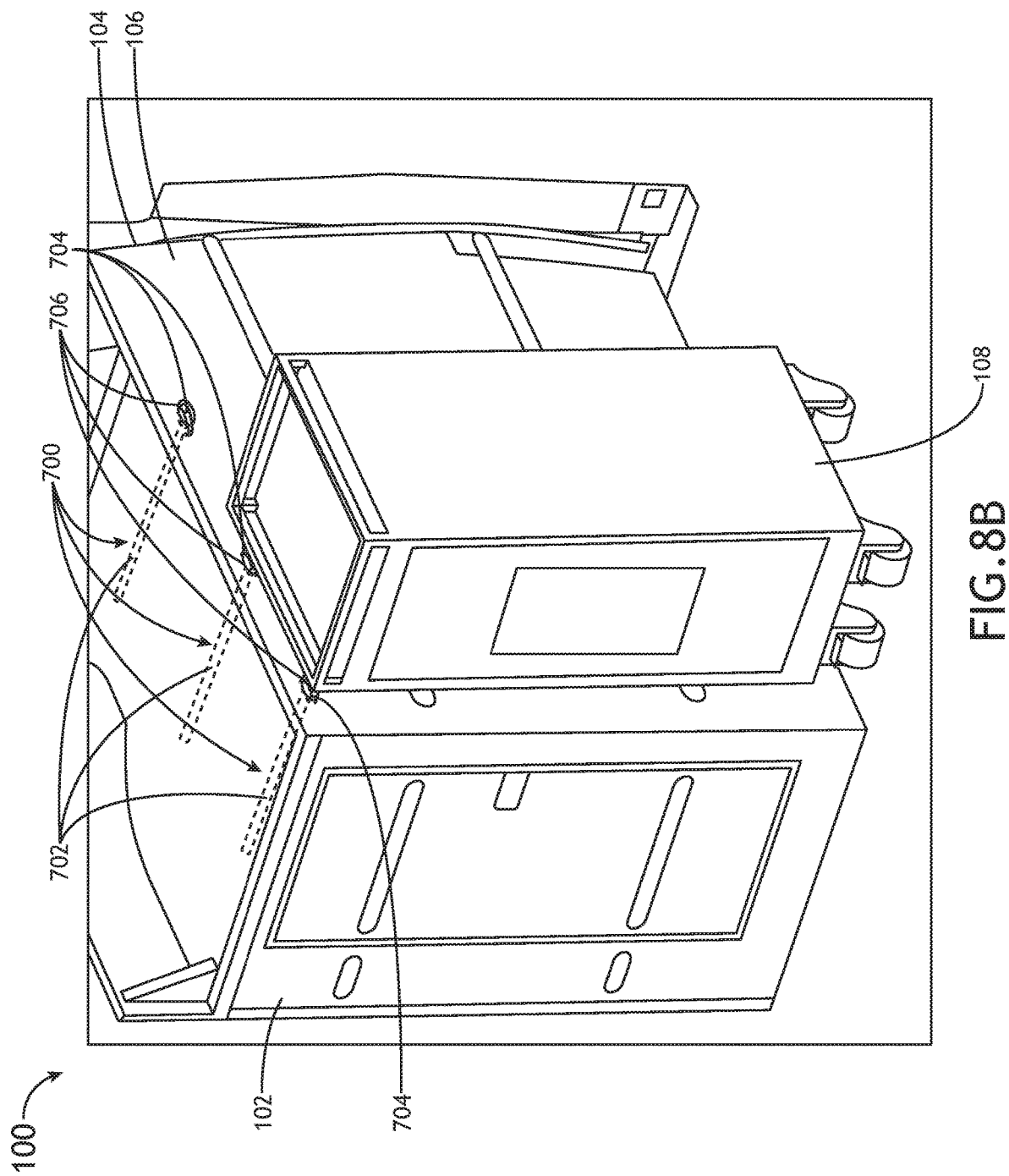
FIG. 8B illustrates a perspective view of an aircraft monument with an aircraft cart retention device and an aircraft cart, in accordance with one or more embodiments of the disclosure.

FIGS. 7A-8B in general illustrate an aircraft cart retention device 700, in accordance with one or more embodiments of the present disclosure. In particular, FIGS. 7A and 7B illustrate the aircraft cart retention device 700 interacting with a full aircraft cart 108. In addition, FIGS. 8A and 8B illustrate the aircraft cart retention device 700 interacting with a reduced-size aircraft cart 108.

The aircraft cart retention device 700 may include a shaft 702 coupled to the structure 104. For example, the shaft 702 may pass through a cut-out within the structure 104. For instance, shaft 702 may be held within the cut-out via interfering components, brackets, or other mechanical components preventing the removal of the shaft 702 from the cut-out.

The shaft 702 may be set an angle relative to the exterior surface 106 of the structure 104. For example, the shaft 702 may be perpendicular or substantially perpendicular to the exterior surface 106 of the structure 104. The shaft 702 may extend outward from the exterior surface 106 of the structure 104 (e.g., into a floor area of the aircraft cabin 100) when the aircraft cart retention device 700 is in a deployed position. The shaft 702 may be inserted into the exterior surface 106 of the structure 104 (e.g., into a floor area of the aircraft cabin 100) when the aircraft cart retention device 700 is in a stowed position.

The aircraft cart retention device 700 may include a latch 704 configured to retain the aircraft cart 108 when the aircraft cart retention device 700 is in the deployed position. It is noted herein the shaft 702 and the latch 704 may be considered a shaft assembly, for purposes of the disclosure.

The latch 704 may be positioned at one or more locations against the retained aircraft cart 108 to ensure universality with any size and/or height of aircraft cart 108. For example, the latch 704 may be configured to pass through openings within the aircraft cart 108 (e.g., openings formed by the aircraft cart 108 including handles). By way of another example, the latch 704 may be of a length configured to retain the aircraft cart 108 along the body of the aircraft cart 108 at one or more heights (e.g., an upper height, a lower height, and/or one or more intermediate heights). By way of another example, the latch 704 may be of a length configured to retain the aircraft cart 108 along the cart content door and/or the body of the aircraft cart 108 at one or more heights (e.g., an upper height, a lower height, and/or one or more intermediate heights).

The latch 704 may be configured to actuate (e.g., rotate about an axis through the shaft 702) between a closed position and an open position. For example, the closed position may be a position in which the latch 704 retain the aircraft cart 108 when the aircraft cart retention device 700 is in the deployed position. By way of another example, the open position may be a position in which the latch 704 allows the aircraft cart 108 to be moved from a position proximate to the exterior surface 106 of the structure 104 when the aircraft cart retention device 700 is in the stowed position.

The aircraft cart retention device 700 may be configured to pass through the structure 104 into the monument 102 when translating between a deployed position and a stowed position. The latch 704 may be configured to stow within a corresponding cavity 706 (e.g., a groove, an indentation, cut-out, or the like).

Referring now to FIGS. 7A and 7B, a set of four aircraft cart retention devices 700 may retain a full-size aircraft cart 108. Each aircraft cart retention device 700 may actuate (e.g., translate) from a deployed position (e.g., as illustrated in FIG. 7A) to a stowed position (e.g., as illustrated in FIG. 7B). Although not shown, it should be understood each aircraft cart retention device 700 may similarly actuate (e.g., translate) from the stowed position to the deployed position. In addition, although not shown, it should be understood each aircraft cart retention device 700 may be configured to actuate (e.g., translate) through one or more intermediate positions.

Referring now to FIGS. 8A and 8B, a set of two aircraft cart retention devices 700 may retain a reduced-size aircraft cart 108. Each aircraft cart retention device 700 may actuate (e.g., translate) from a deployed position (e.g., as illustrated in FIG. 8A) to a stowed position (e.g., as illustrated in FIG. 8B). Although not shown, it should be understood each aircraft cart retention device 700 may similarly actuate (e.g., rotate) from the stowed position to the deployed position. In addition, although not shown, it should be understood each aircraft cart retention device 700 may be configured to actuate (e.g., translate) through one or more intermediate positions.

To maintain universality of the aircraft cart retention system, at least three aircraft cart retention devices 700 may need to be installed within the aircraft cabin 100. For example, a first aircraft cart retention device 700 may be installed for both a short a full-size or a reduced-size galley cart 108 (e.g., as illustrated in FIGS. 7A-8B), a second aircraft cart retention device 700 may be installed for a full-size galley cart 108 (e.g., as illustrated in FIGS. 7A and 7B), and a third aircraft cart retention device 700 may be installed for a reduced-size galley cart 108 (e.g., as illustrated in FIGS. 8A and 8B). It is noted herein, however, the aircraft cart retention system is not limited to the three aircraft cart retention devices 700 (e.g., as illustrated in FIGS. 7A-8B), but instead may include any number of aircraft cart retention devices 700.

It is noted herein retaining the aircraft cart 108 within the aircraft cart retention system may require the following steps: pull out the aircraft cart retention devices 700 specific to the aircraft cart 108 size (e.g., wide or narrow), park the aircraft cart 108, and turn the latches 704 specific to the aircraft cart 108 height (e.g., tall or short). Although not shown, it should be understood the above order of steps is non-limiting, and that removing the aircraft cart 108 may require the steps in a reverse order from those listed above. In addition, it should be understood the above order of steps is non-limiting, and retaining and/or removing the aircraft cart 108 may require more or fewer steps performed in a same or different order than those listed above.

The cavity 706 may be partially or fully cut-out from the structure 104. In general, the cavity 706 may be configured to receive a corresponding latch 704 such that the latch 704 is inset within the structure 104 when the aircraft cart retention device 700 is in the stowed position (e.g., as illustrated in FIGS. 7B and 8B). In this regard, the aircraft cart retention device 700 may not interfere (e.g., stick out into) a floor area of the aircraft cabin 100 when the aircraft cart 108 is not being retained by the aircraft cart retention device 110. It is noted herein, however, the latch 704 may be configured to stow flush against the exterior surface 106 of the structure 104.

It is noted herein the shaft 702 and the shaft assembly may be considered a member 702 and a member assembly, respectively, for purposes of the present disclosure.

Although embodiments of the disclosure illustrate the aircraft cart retention devices 700 being mounted to or installed within the structure 104, it is noted herein the structure 104 is non-limiting and the aircraft cart retention devices 700 may be mounted to or installed within any structure within the aircraft cabin 100. Therefore, the above description should not be interpreted as a limitation on the present disclosure but merely an illustration.

It is noted herein components installed within the aircraft cabin 100, the aircraft cart 108, and/or the aircraft cart retention devices 110, 400, 700 may need to be configured in accordance with aviation guidelines and/or standards set forth by, but not limited to, the Federal Aviation Administration (FAA), the European Aviation Safety Agency (EASA) or any other flight certification agency or organization; the American National Standards Institute (ANSI), Aeronautical Radio, Incorporated (ARINC), SAE International, or any other standards setting organization or company; the Radio Technical Commission for Aeronautics (RTCA) or any other guidelines agency or organization; or the like. For instance, SAE International's Aerospace Standard (AS) 8056, *MINIMUM DESIGN AND PERFORMANCE OF AIRPLANE GALLEY IN-FLIGHT CARTS, CONTAINERS, AND ASSOCIATED COMPONENTS*, and EASA's *European Technical Standard Order (ETSO) C175, GALLEY CART, CONTAINERS AND ASSOCIATED COMPONENTS* sets forth requirements for galley carts, containers and associated components In this regard, the retention devices 110, 400, 700 are lightweight mechanisms to replace a strap or chain. The retention devices 110, 400, 700 are a more secure approach to retaining the galley cart 108. In addition, the retention devices 110, 400, 700 offer an aesthetically appealing alternative to the strap or chain. Further, the retention devices 110, 400, 700 provide a simple and intuitive retention and release function.

Although embodiments of the disclosure illustrate the aircraft cart retention devices 110, 400, 700 being installed within the aircraft cabin 100, it is noted herein, however, that the aircraft cart retention devices 110, 400, 700 and/or components of the aircraft cart retention devices 110, 400, 700 are not limited to the aviation environment and/or the aircraft components within the aviation environment. For example, the aircraft cart retention devices 110, 400, 700 and/or components of the aircraft cart retention devices 110, 400, 700 may be configured for any type of vehicle known in the art. For instance, the vehicle may be any air, space, land, or water-based personal equipment or vehicle; any air, space, land, or water-based commercial equipment or vehicle; any air, space, land, or water-based military equipment or vehicle known in the art. By way of another example, the aircraft cart retention devices 110, 400, 700 and/or components of the aircraft cart retention devices 110, 400, 700 may be configured for commercial or industrial use in either a home or a business. Therefore, the above description should not be interpreted as a limitation on the present disclosure but merely an illustration.

Although the disclosure has been described with reference to the embodiments illustrated in the attached drawing figures, equivalents may be employed and substitutions made herein without departing from the scope of the claims. Components illustrated and described herein are merely examples of a system/device and components that may be used to implement embodiments of the disclosure and may be replaced with other devices and components without departing from the scope of the claims. Furthermore, any dimensions, degrees, and/or numerical ranges provided herein are to be understood as non-limiting examples unless otherwise specified in the claims.

What is claimed:

1. An aircraft cart retention system, comprising:
   a first aircraft cart retention device configured to actuate between a first deployed position and a first stowed position, the first aircraft cart retention device comprising:
   at least one member coupled to a structure installed within an aircraft cabin; and
   at least one latch coupled to the at least one member; and a second aircraft cart retention device configured to actuate between a second deployed position and a second stowed position, the second aircraft cart retention device comprising:
  at least an additional member coupled to the structure installed within the aircraft cabin; and
  at least an additional latch coupled to the at least an additional member,
the first aircraft cart retention device and the second aircraft cart retention device configured to retain an aircraft cart in a position proximate to an exterior surface of the structure with at least two combined points of contact during non-taxi, takeoff, or landing (non-TTL) stages of flight when the first aircraft cart retention device is in the first deployed position and the second aircraft cart retention device is in the second deployed position,
the first aircraft cart retention device and the second aircraft cart retention device configured to allow the aircraft cart to be removed from the position proximate to the exterior surface of the structure when the first aircraft cart retention device is in the first stowed position and the second aircraft cart retention device is in the second stowed position,
the structure including a first cavity configured to receive the first aircraft cart retention device when the first aircraft cart retention device is in the first stowed position, the first aircraft cart retention device being configured to be at least partially inset within the first cavity when the first aircraft cart retention device is in the first stowed position,
the structure including a second cavity configured to receive the second aircraft cart retention device when the second aircraft cart retention device is in the second stowed position, the second aircraft cart retention device configured to be at least partially inset within the second cavity when the second aircraft cart retention device is in the second stowed position.

2. The aircraft cart retention system of claim 1, the at least one member including a first linkage, a second linkage, and a first connecting linkage coupled to the first linkage and the second linkage; and
  the at least an additional member including a third linkage, a fourth linkage, and a second connecting linkage coupled to the third linkage and the fourth linkage.

3. The aircraft cart retention system of claim 2, the at least one latch including a first latch coupled proximate to a first joint coupling the first linkage and the first connecting linkage, and a second latch coupled proximate to a second joint coupling the second linkage and the first connecting linkage; and
  the at least an additional latch including a third latch coupled proximate to a third joint coupling the third linkage and the second connecting linkage, and a fourth latch coupled proximate to a fourth joint coupling the fourth linkage and the second connecting linkage.

4. The aircraft cart retention system of claim 1, the at least one member being configured to rotate about at least one axis through at least one hinge coupling the at least one member to the structure, the at least an additional member being configured to rotate about an at least an additional axis through an at least an additional hinge coupling the at least an additional member to the structure.

5. The aircraft cart retention system of claim 4, the at least one axis and the at least an additional axis being collinear.

6. The aircraft cart retention system of claim 1, the at least one member comprising at least one shaft, the at least an additional member comprising at least an additional shaft.

7. The aircraft cart retention system of claim 6, the at least one shaft being configured to extend outward from the structure when the first aircraft cart retention device is in the deployed position, the at least one shaft being configured to be inserted in the structure when the first aircraft cart retention device is in the deployed position,
the at least an additional shaft being configured to extend outward from the structure when the second aircraft cart retention device is in the deployed position, the at least an additional shaft being configured to be inserted in the structure when the second aircraft cart retention device is in the deployed position.

8. The aircraft cart retention system of claim 1, further comprising:
  a third aircraft cart retention device configured to actuate between a third deployed position and a third stowed position, comprising:
    at least a third member coupled to the structure installed within the aircraft cabin; and
    at least a third latch coupled to the at least a third member,
  the first aircraft cart retention device and the third aircraft cart retention device configured to retain a second aircraft cart in a second position proximate to the exterior surface of the structure with at least two points of contact during the non-TTL stages of flight when the first aircraft cart retention device is in the first deployed position and the third aircraft cart retention device is in the third deployed position,
  the first aircraft cart retention device and the third aircraft cart retention device configured to allow the aircraft cart to be removed from the second position proximate to the exterior surface of the structure when the first aircraft cart retention device is in the first stowed position and the third aircraft cart retention device is in the third stowed position,
  the second aircraft cart being smaller than the first aircraft cart.

9. An aircraft cart retention system, comprising:
  an aircraft cart retention device configured to actuate between a deployed position and a stowed position, comprising:
    a first primary member coupled to a structure installed within an aircraft cabin;
    a second primary member coupled to the structure installed within the aircraft cabin; and
    at least one auxiliary member coupled to the first primary member and the second primary member,
  the aircraft cart retention device configured to retain an aircraft cart in a position proximate to an exterior surface of the structure during non-taxi, takeoff, or landing (non-TTL) stages of flight when the aircraft cart retention device is in the deployed position,
  the aircraft cart retention device configured to allow the aircraft cart to be removed from the position proximate to the exterior surface of the structure when the aircraft cart retention device is in the stowed position,
  the structure including a cavity configured to receive the aircraft cart retention device when the aircraft cart retention device is in the stowed position, the aircraft cart retention device being configured to be at least partially inset within the cavity when the aircraft cart retention device is in the stowed position.

10. The aircraft cart retention system of claim 9, at least one separator member being coupled to the structure installed within the aircraft cabin, the at least one separator member being configured to actuate between a second deployed position and a second stowed position, the aircraft cart retention device and the at least one separator member being configured to retain a second aircraft cart in a second position proximate to the exterior surface of the structure during the non-TTL stages of flight when the aircraft cart retention device is in the first deployed position and the at least one separator member is in the second deployed position, the aircraft cart retention device and the at least one separator member being configured to allow the aircraft cart to be removed from the second position proximate to the exterior surface of the structure when the aircraft cart retention device is in the first deployed position and the at least one separator member is in the second deployed position, the second aircraft cart being smaller than the first aircraft cart.

11. The aircraft cart retention system of claim 9, the at least one separator member being configured to independently actuate relative to the aircraft cart retention device.

12. The aircraft cart retention system of claim 9, the at least one separator member being configured to couple to the at least one auxiliary member of the aircraft cart retention device.

13. The aircraft cart retention system of claim 9, the structure including a second cavity configured to receive the at least one separator member when the at least one separator member is in a second stowed position, the aircraft cart retention device configured to be at least partially inset within the second cavity when a second aircraft cart retention device is in the second stowed position, the second cavity being connected with the cavity.

* * * * *